(12) United States Patent
Georgi

(10) Patent No.: US 10,614,478 B1
(45) Date of Patent: *Apr. 7, 2020

(54) DIRECTED DIGITAL CURRENCY SYSTEM, METHOD, AND APPARATUS

(71) Applicant: Randolph Georgi, Mill Valley, CA (US)

(72) Inventor: Randolph Georgi, Mill Valley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/185,972

(22) Filed: Nov. 9, 2018

Related U.S. Application Data

(63) Continuation-in-part of application No. 14/633,012, filed on Feb. 26, 2015, now Pat. No. 10,157,400.

(51) Int. Cl.
| | | |
|---|---|---|
| *G06Q 30/00* | (2012.01) | |
| *G06Q 30/02* | (2012.01) | |
| *G06F 16/22* | (2019.01) | |

(52) U.S. Cl.
CPC ..... *G06Q 30/0227* (2013.01); *G06F 16/2291* (2019.01)

(58) Field of Classification Search
CPC .................................. G06Q 30/0227
USPC ......................................... 705/14
See application file for complete search history.

(56) References Cited

U.S. PATENT DOCUMENTS

| | | | |
|---|---|---|---|
| 5,987,606 A | 11/1999 | Cirasole et al. | |
| 6,151,604 A | 11/2000 | Wlaschin et al. | |
| 8,620,738 B2 | 12/2013 | Fordyce, III | |
| 8,800,857 B1 | 8/2014 | Butler et al. | |
| 8,880,905 B2 | 11/2014 | Colclasure et al. | |
| 9,836,759 B2 | 12/2017 | Georgi | |
| 10,157,400 B1 | 12/2018 | Georgi | |
| 2004/0117261 A1 | 6/2004 | Walker et al. | |
| 2008/0154726 A1 | 6/2008 | Bennett | |
| 2009/0030793 A1* | 1/2009 | Fordyce, III ........... | G06Q 20/12 705/14.27 |
| 2010/0023430 A1 | 1/2010 | Hunter et al. | |

(Continued)

OTHER PUBLICATIONS

U.S. Appl. No. 13/959,393, filed Dec. 5, 2017, Georgi; Randolph Ken.

(Continued)

*Primary Examiner* — Matthew L Hamilton
(74) *Attorney, Agent, or Firm* — Heimlich Law, PC; Alan Heimlich, Esq.

(57) ABSTRACT

A directed digital currency system, method, and apparatus comprising a proprietary directed digital currency comprising voucher-tag-objects; a network of purpose systems that generate and use the directed digital currency; purpose system members; a network processor; physical tags, tag-objects and apparatuses including modules configured for identification, qualification, generation, aggregation, detection, and redemption of elements including the directed digital currency in accordance with interoperability rules; directed digital currency redeemers configured to redeem the directed digital currency; users that receive and redeem the directed digital currency in exchange for an exchange item; a process to collect value to pay for units of the directed digital currency generated; and a process to disburse value to directed digital currency redeemers that redeem units of the directed digital currency.

40 Claims, 13 Drawing Sheets

Example Directed Digital Currency System

CURRENCY SYSTEM 100

(56) References Cited

U.S. PATENT DOCUMENTS

| | | |
|---|---|---|
| 2010/0145778 A1 | 6/2010 | Fordyce, III |
| 2010/0145786 A1 | 6/2010 | Fordyce, III |
| 2011/0055231 A1 | 3/2011 | Huck |
| 2011/0087530 A1 | 4/2011 | Fordyce, III |
| 2011/0307318 A1 | 12/2011 | LaPorte |
| 2012/0066051 A1 | 3/2012 | Black |
| 2012/0130536 A1 | 5/2012 | Canter et al. |
| 2012/0166264 A1 | 6/2012 | Shum |
| 2013/0262198 A1 | 10/2013 | Chung |
| 2014/0222539 A1 | 8/2014 | Scholz |
| 2015/0161596 A1 | 6/2015 | McCarthy |
| 2017/0031963 A1 | 2/2017 | Merz |

OTHER PUBLICATIONS

*Enfish, LLC* v. *Microsoft Corp*, U.S. Pat. No. 6,163,775, Case 2015-1244, Decided: May 12, 2016; pp. 5, 7, 9-20, 30.
*Bascom Global Internet Services* v. *AT&T Mobility LLC*, 827 F.3d 1341 (Fed. Cir. 2016), 2015-1763. Decided: Jun. 27, 2016.
Memorandum to Patent Examining Corp, by Robert Bahr, May 19, 2016 re: Recent Subject Matter Eligibility Decisions.
Memorandum to Patent Examining Corp, by Robert Bahr, Nov. 2, 2016 re: Recent Subject Matter Eligibility Decisions.
Notice of Allowance and Fee(s) Due, dated Sep. 20, 2017, for U.S. Appl. No. 13/959,393. Includes Detailed Action.
U.S. Appl. No. 14/633,012 (unpublished), "Interoperable Reward Currency System, Method, an d Apparatus." Inventor: Randolph Ken Georgi. filed Feb. 26, 2015.
*McRo, Inc. dba Planet Blue* v. *Bandai Namco Games America Inc.*, 120 USPQ2d 1091 (Fed. Cir. 2016).
Paul E. Black (ed.). Dictionary of Algorithms and Data Structures. U.S. National Institute of Standards and Technology. Dec. 15, 2004.
National Information Standards Organization (NISO) (2001). Understanding Metadata (PDF). NISO Press. ISBN 1-880124-62-9. 18 PP.
USPTO Information Technology Standards and Guidelines Program, Electronic Records Management, Technical Standard and Guideline IT-212.03-15. Jul. 2002,58 pages, p. 2-6.
URL: http://searchoracle.techtarget.com/definitionlrecord Oracle Corporation definition of "record".
URL: https:lJen.wikipedia.orglwikifRecord_(computer~science) Wikipedia definition of database "record".
URL: https:lJen.wikipedla.org/wikl/Metadata Wikipedia definition of "metadata".
URL: https:lJen.wikipedla.org/wiklrrag Wikipedia definition of "tag".
URL: https:lJen.wikipedia.orglwiki/Tag_(metadata) Wikipedia definition of "tag (metadata)".
URL: https:lJen.wikipedia.org/wiki/Cryptographic_hash_function Wikipedia definition of "Cryptographic hash function".
URL: htlp:l/IMNW.aspencryptcom/cryptol 01_hash.html Persits Software, Inc, New York, NY 10018. Chapter 3 One-way Hash Functions.

\* cited by examiner

Example Databases in Currency System 100

4200 →

REFERENCE QUALIFYING EVIDENCE 86 TAGS 47 DATABASE 921

|  | REFERENCE QUALIFYING EVIDENCE 86 TAG 47 |
|---|---|
| 430 | QE1 |
|  | QE2 |
|  | QE3 |
|  | QE4 |

REFERENCE INTEROPERABILITY TAGS 31 DATABASE 922

|  | REFERENCE INTEROPERABILITY TAG 31 | TIMESTAMP |
|---|---|---|
| 440 | i4 | 1/5/2015 0300 |
|  | i5 | 1/6/2015 0300 |
|  | i6 | 1/7/2015 0300 |
|  | i7 | 1/8/2015 0300 |

REFERENCE VOUCHER IDENTITY TAGS 15 DATABASE 923

|  | REFERENCE VOUCHER IDENTITY TAG 15 |
|---|---|
| 450 | vid1 |
|  | vid2 |
|  | vid3 |
|  | vid4 |

FIG 4C

DIRECTED DIGITAL CURRENCY SYSTEM, METHOD, AND APPARATUS

CROSS REFERENCE TO RELATED APPLICATIONS

This continuation in part patent application claims priority of pending U.S. application Ser. No. 14/633,012 (called herein "'012"), filed Feb. 26, 2015 by the same inventor, titled "Interoperable Reward Currency System, Method, And Apparatus," for which a Notice of Allowance was issued on Oct. 17, 2018. This application is also related to U.S. Pat. No. 9,836,759 B2, (called herein "'759") titled "Universal Transaction Associating Identifier," which was issued on Dec. 5, 2017 for U.S. patent application Ser. No. 13/959,393, filed Aug. 5, 2013, which claims priority to U.S. Provisional Patent Application Ser. No. 61/680,131, filed Aug. 6, 2012, titled, "Systems and Methods for Electronic Reward Generation with Universal Transaction Identifier," by the same inventor. All said patents and provisional and non-provisional patent applications are herein incorporated by reference in their entirety for all purposes.

FIELD

The disclosure generally relates to the field of electronic currency, and more specifically, to a directed digital currency in a digital currency system.

BACKGROUND

Unless otherwise indicated, the approaches described in this section are not prior art to the claims in this application and are not admitted to be prior art by inclusion in this section.

Conventional digital currencies are well known in the art and can generally be exchanged or used for any purpose, much like government-issued legal tender, e.g., a dollar.

Conventional digital currencies (e.g., Bitcoin, Ethereum, or points in a reward system) typically lack an inherent capability: 1) to be directed toward, and thereby to be limited to, a specific purpose, goal, or objective; or 2) to embed within each unit of the digital currency an encoded control, comprising a restriction or limitation, that can, for example, a) direct an issuance, an exchange, or a use of the digital currency toward a particular type of digital currency redeemer, or a targeted recipient, or another participant in a currency system; or b) apply a qualification or a condition to its issuance, redemption, exchange, or use; or 3) to embed within each unit of a digital currency encoded information, e.g., regarding an issuer, a currency system, a program, a history, transaction data, or other useful information.

In a first exemplary deficiency, the absence of said capabilities renders conventional digital currencies deficient for many useful purposes or goals of an issuer or a currency system.

A second deficiency is that digital currency issuers do not have a means to apply a control, a limitation, or a direction (toward a purpose) to their conventional digital currency.

A third deficiency is that issuers of a conventional digital currency do not have a technical infrastructure, a suitable network, or a capability to issue, process, redeem, exchange, receive, authorize, track, analyze, or use a directed digital currency with its useful features.

A fourth deficiency is that currency issuers are unable to derive substantial economic, behavior modifying, incentivizing, and other benefits enabled by a directed digital currency.

A fifth deficiency is that issuers of a conventional digital currency are typically not connected or configured for interoperability among one or more digital currency systems. Thus a common currency cannot be processed among disparate unaffiliated currency systems.

To address such deficiencies, the present invention introduces and discloses a new kind of digital currency, namely a directed digital currency, hereafter called a "DirCurrency 11," which does not presently exist.

A DirCurrency 11 is substantially similar to, and comprises all of the features, capabilities, and uses of an interoperable reward currency disclosed in '012 with respect to its methods, mechanisms, and technology, however the features, uses, capabilities, and applications of a DirCurrency 11 are broader and can apply to different technological environments.

BRIEF DESCRIPTION OF THE DRAWINGS

Disclosed embodiments have other advantages and features that will be more readily apparent from the detailed description, the appended claims, and the accompanying figures.

FIG. 4C illustrates, generally at 4200, three example databases in the currency system 100 shown in FIG. 1.

FIG. 5B further comprises a flowchart, generally at 5200, illustrating an example process designed for requesting issuance of a voucher-tag-object in the system shown in FIG. 1.

SUMMARY

Figure 1:
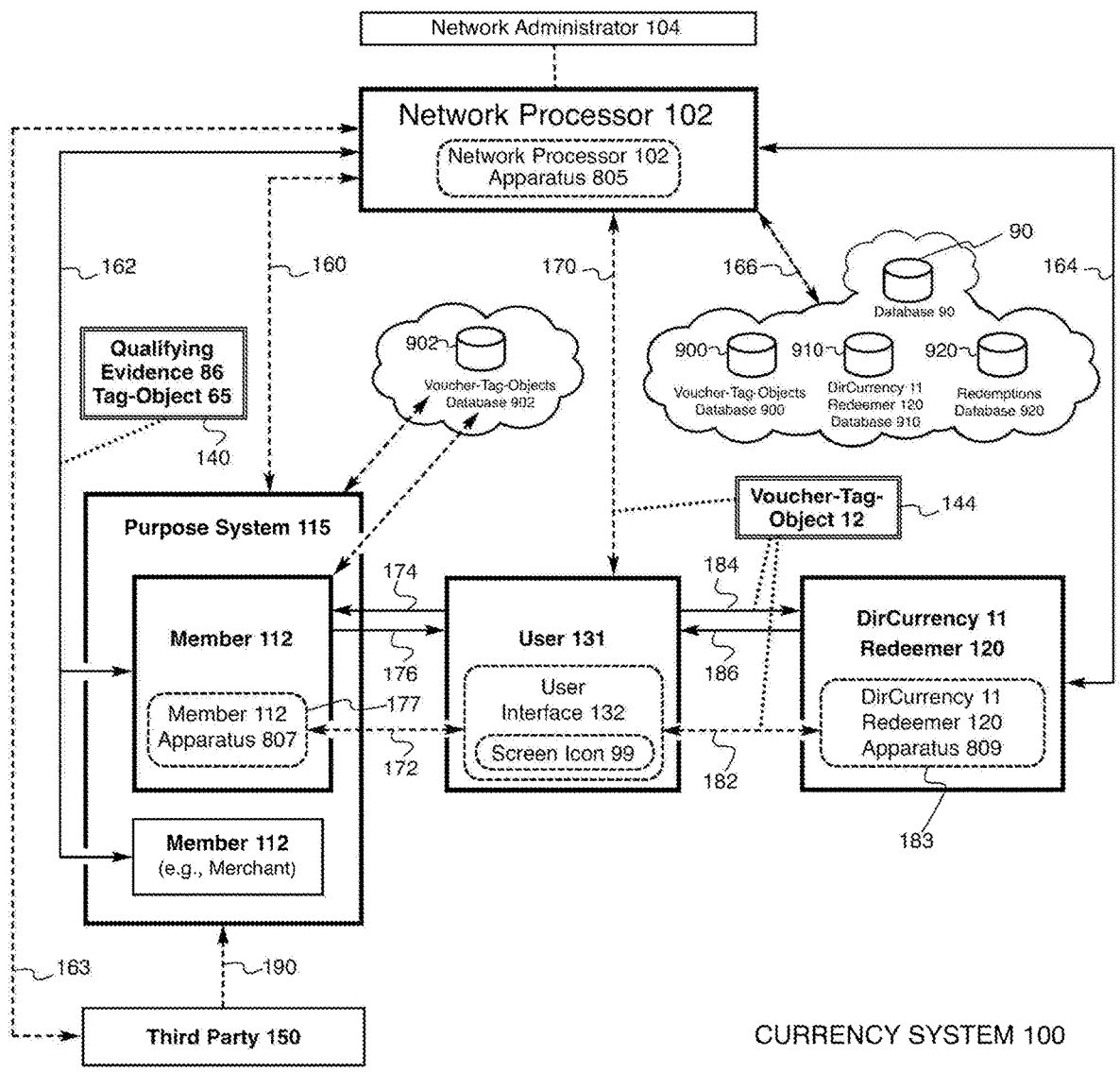
FIG. 1 illustrates, generally at currency system 100, one embodiment of a directed digital currency system.

The present invention discloses a directed digital currency in a directed digital currency system comprising: 1) a proprietary directed digital currency comprising voucher-tag-objects; 2) a network of purpose systems configured for generating and using the directed digital currency; 3) a set of members per purpose system; 4) a network (system) processor; 5) physical tags 35 and tag-objects, used for controls, interoperability, identification, and other purposes; 6) apparatuses including modules for generating and detecting tags 35 and tag-objects, enrolling system participants, configuring apparatuses, and performing other functions; 7) interoperability rules applied to apparatuses, modules, tags 35, tag-objects, and processes; 8) a process to qualify prospective recipients of a DirCurrency 11, comprising a process to identify transactions instead of users; 9) a set of DirCurrency 11 redeemers configured to exchange the directed digital currency for an exchange item 16; 10) users that receive and redeem the DirCurrency 11; 11) a process to collect value, e.g., to pay for the DirCurrency 11 comprising voucher-tag-objects generated; and 12) a process to disburse value to DirCurrency 11 redeemers that redeem them.

The directed digital currency of the present invention is also called herein a voucher-tag-object, comprising a unit of exchange and an embodiment of value. A voucher-tag-object is a voucher associated with a currency system 100-generated tag 35, which can comprise, contain, or be configured as an ordered combination, comprising a set of digital elements in a string 83 and further comprising a logical structure, the digital elements of a tag 35 comprising one or more of data, metadata (e.g., one or more of a tag 35, an identifier, a rule, an instruction, and a code), and additional data. The digital elements (i.e., string 83) can further comprise an example element comprising a computer methodology for enabling at least one computer operation, and can further comprise a query parameter for matching of elements in a plurality of database records, comprising an element for use in a database query. A voucher-tag-object further comprises a tag 35 comprising: 1) an entry in at least one database record; and 2) a self-authenticating feature; and 3) a standardized form. A voucher-tag-object further comprises a feature comprising a capability for and an enabling of an executing of at least one computer operation via a tag 35 associated with the voucher-tag-object.

A voucher-tag-object can be generated by a computer system in a non-transitory machine readable medium. Further, a voucher-tag-object can comprise one or more of various forms or embodiments, including 1) an electronic representation in a machine, 2) at least one of a physical and a digital voucher-tag-object in any form; 3) an embodiment in a machine-readable non-transitory medium; and 4) a representation recorded in a database, enabling its use in a computer operation, each form or embodiment representing the same unit of DirCurrency 11.

The present invention provides for interoperability among its voucher-tag-objects, processes, apparatuses, modules, tags 35, purpose systems, and other elements. A voucher-tag-object comprises a voucher associated with a system-generated interoperability tag. The present invention is further intended to be configured for interoperability and integration with third party systems, devices, networks, software, and technologies, e.g., in payment and transaction processing systems (offline and online), point-of-sale (POS) systems, and among near field communications (NFC)-enabled mobile devices, Internet of Things (or Everything) ("IoT") devices, and the like. A voucher-tag-object can be aggregated interoperably with voucher-tag-objects from the same or unaffiliated purpose systems to exchange for an exchange item.

In one embodiment, a voucher-tag-object can be generated via an icon associated with a user interface, e.g., by pressing a button on a screen.

A voucher-tag-object can be associated with a voucher fee and an exchange fee for collecting and disbursing value to support the DirCurrency 11.

A DirCurrency 11 can be used for any purpose in a proprietary network comprising at least one purpose system 115 consisting of members. A purpose system is defined below. A DirCurrency 11 and the present currency system 100 provide an unprecedented operational, motivational, and marketing tool for purpose systems and for DirCurrency 11 redeemers. Its purposes can include issuing and distributing value for any reason, incentivizing customers, marketing, commercial, social, cost-reduction, behavioral, and other objectives.

In particular, a DirCurrency 11 can be applied to or utilized for a wide variety of uses, including for any purpose or limitation that can be encoded in a tag 35 tied to a voucher-tag-object. Such uses can include but are not limited to: 1) directing the use of one or more units of DirCurrency 11 toward: a) a certain purpose, e.g., a goal or objective; or b) a redemption, subject to restrictions, at one or more of a set of authorized DirCurrency 11 redeemers 120. Exemplary said purposes associated with a DirCurrency 11 can include incentives, terms, conditions, limitations, and restrictions which are set: 1) by one or more employers for any DirCurrency 11 it distributes to achieve goals such as employee productivity or performance or to convey benefits, and the like; 2) by a government, social, welfare, or other organization for any DirCurrency 11 it distributes to achieve goals such as providing food, clothing, housing, living expenses, transportation, transit, and the like; 3) by a government, a foundation, a nonprofit, a charitable organization, and the like, for any DirCurrency 11 it distributes, comprising a grant, to achieve goals such as energy conservation, energy practices; pollution mitigation; environmental and social programs; emergencies and disaster relief; innovation and research promotion; scientific, engineering, education, and health- or medical-related purposes; entrepreneurship; risk-taking; trade and economic practices; safety and security measures; social goals; drug use; and the like; 4) by a business for any DirCurrency 11 it distributes to achieve goals such as inducing or promoting a user behavior, purchasing, marketing, advertising, promotion, programs, new business, referrals, leads, and advertising responses; 5) by an educational, medical, sports, or other organization for any DirCurrency 11 it distributes to achieve goals such as student, patient, athlete, or other performance, improvements, attendance, and the like; 6) by a regulatory, law enforcement, or other agency for any DirCurrency 11 it distributes to achieve goals such as compliance, information gathering, and the like; 7) by a contest, sweepstakes, and the like for any DirCurrency 11 it distributes to serve as a prize; 8) by a nonprofit for any DirCurrency 11 it distributes or receives to achieve goals such as charitable contributions by individuals, firms, and others; and volunteering; and 9) by an individual for any DirCurrency 11 he or she distributes to achieve goals such as giving, gift cards, donations, incentives, rewards, gestures; and the like. Further, a DirCurrency 11 can be used for any type of incentive, behavior, act, or reward 16, wherein a reward 16 is broadly defined as set forth in '012.

A DirCurrency 11 is further intended for any use and can be exchangeable in any currency, business, enterprise, government, marketing, marketplace, incentive, reward, loyalty, or other system for any purpose for which it may be suited without limitation.

One of skill in the art will recognize that many uses and applications of a DirCurrency 11 can exist and be applied beyond those described above.

DETAILED DESCRIPTION

Embodiments of the present invention include a directed digital currency 11 (DirCurrency 11) in a directed digital currency system 100 (hereinafter "currency system 100") that has particular application in a computer network comprising one or more purpose systems.

A DirCurrency 11 comprises a directed digital currency, comprising a directed token of value; and further comprising a directed unit or medium of exchange; and further comprising a store of value: 1) for any kind of value that can be conveyed for any purpose via a directed digital currency 11, as explained herein; or 2) for any issuance, conveyance, or exchange for any type of a reward 16 as broadly defined in '012, or for an exchange item 16 as defined below.

A DirCurrency 11 can further comprise a controlled digital currency, comprising a control or management via any controllable criterion encoded in a tag 35 as disclosed herein.

A DirCurrency 11 can further comprise an interoperable directed digital currency.

One or more units of a DirCurrency 11 can be, for example: 1) issued (comprising distributed, exchanged, conveyed, sold, or traded) by a particular DirCurrency 11 issuer; or 2) directed toward any particular goal or purpose or objective of the issuer; or 3) directed toward an exchange or a redemption at one or more of a specified DirCurrency 11 redeemer 120 or at a type or a limited set of DirCurrency 11 redeemers 120; or 4) directed toward an exchange or a redemption for a certain type of item for which one or more units of DirCurrency 11 can be exchanged; or 5) limited with respect to time, cost, security, and other controls; or 6) associated with a message, enabling communication of any purpose, control, restriction, and the like.

In this context, the term "directed" (in a directed digital currency) and its derivatives shall mean a control comprising one or more of a purpose, an objective, a limitation, a restriction, a condition, a term of use, and the like, wherein a control can be digitally encoded and tied to one or more units of a DirCurrency 11. In particular, in order for a directed digital currency (DirCurrency 11) to be so directed, a said feature must be implemented by a mechanism or means that provides such a capability, attached to each unit of the DirCurrency 11 itself. The present invention provides such a mechanism for applying a said feature.

Each unit of DirCurrency 11 possesses specific features that it acquires upon its generation. Generation of a unit of DirCurrency 11 comprises a combining (coupling) of a tag 35 with an object 61, creating a tag-object 60 (as recited in '012). As disclosed above, a tag 35 comprises an ordered combination of digital elements within its code (a string 83), comprising data and metadata. Via a code (in a string 83) that can be generated, applied, and meaningfully detected by a suitably configured apparatus 800 in a currency system 100, digital elements in a tag 35 can define and assign features of a DirCurrency 11, e.g., how each unit of DirCurrency 11 can be one or more of directed, or controlled, or interoperable. Said capabilities and controls can operate at any step in the life cycle of each unit of DirCurrency 11 including, e.g., for authorizing issuance, applying restrictions, conveying to an account, verifying authenticity, authorizing a redemption, using in a physical location or on a website, or exchanging for an exchange item 16.

In one embodiment, an exemplary tag 35, and corresponding units of DirCurrency 11, can be generated or used via activating a user interface module 132. A said activating can comprise, e.g, pressing of an icon (e.g., a button) on a display screen (e.g., a computer, a smart phone, a mobile device, a point of sale terminal, or a website), or a voice command.

In addition, a said DirCurrency 11 can be: 1) tracked at each step of its history or life cycle; and 2) subject to any kind of analytics, including with regard to corresponding issuers, qualifying steps, transactions, behaviors, currency systems, marketplace activity, and the like.

Differences with '012

Certain terms recited in U.S. patent application '012 are replaced by "replacement terms" newly disclosed herein. A definition for each said replacement term is provided below. Each replacement term is substantially similar to, yet generally broader than the term it replaces. In each case, a replacement term replaces a term used in the '012 specification or in '012 Figures with the new term substituted in the present specification and Figures, as detailed below.

The '012 term reward currency 11 is replaced herein by directed digital currency 11 or DirCurrency 11. Similar to a unit of interoperable reward currency in '012, a unit of DirCurrency 11 can be generated in the form of a voucher-tag-object 12 as recited in '012.

The '012 term reward system 110 is replaced herein by a purpose system 115.

The '012 term reward 16 is replaced herein by an exchange item 16.

The '012 term reward provider 120 is replaced herein by a directed digital currency 11 redeemer 120, hereinafter called a DirCurrency 11 redeemer 120.

The '012 term reward program 108 is replaced herein by a purpose program 108.

The '012 term reward fee 20 is replaced herein by an exchange fee 20.

The '012 term consumer 130 is replaced herein by a user 131.

The '012 term reward icon 99 is replaced herein by a screen icon 99.

The '012 term reward-eligible, and its derivatives, is replaced herein by exchange-eligible, and similar terms pertinent to the context.

Other '012 terms recite substantially similar replacement terms as cited above, as will be evident in the context of their disclosure herein.

The drawings (Figures) disclosed in '012 are replaced by substantially similar drawings herein that incorporate the selected replacement terms cited above. Aside from the replacement terms cited above, there are no new drawings or material changes in the drawings.

For each previously cited term in '012 and its replacement term as cited herein, and for any associated derivative term, the present invention shall be understood to substitute the replacement term for the previously cited term, including corresponding structures, elements, processes, methods, and the like, except where expressly recited otherwise herein. While each replacement term substitutes for each previously cited term, as detailed below, the entirety of the '012 specification, and its drawings, are otherwise reiterated without change and are incorporated herein by each said reference, except as cited below. In other words, each '012 paragraph is intended to be incorporated herein in its entirety, substituting only the replacement term, thereby greatly reducing the quantity of text in this specification while disclosing the present invention.

Cited replacement terms are intended to generalize or broaden the scope of a directed digital currency 11 beyond that of an '012 interoperable reward currency, as disclosed above. In particular, the inventive concept in '012 of an interoperable reward currency, comprising a voucher-tag-object 12, is incorporated in full within the present inventive concept of a directed digital currency 11. For example, the present directed digital currency 11: 1) includes yet broadens the uses for a DirCurrency 11 beyond that of an interoperable reward currency; and 2) broadens the types of exchange items 16 that can be exchanged for a unit of DirCurrency 11, as compared to an exchange for a reward 16; and 3) provides for a broader set of DirCurrency 11 redeemers 120 as compared to reward providers 120 in '012.

The present invention further incorporates by this reference the prosecution history of '012, which includes points substantially similar to and relevant to the present invention. For example, such points include but are not limited to references to an ordered combination, a logical structure, a string 83 (including an exemplary string 83 and digital elements), the Enfish patent, the Enfish court decision, query parameters, and database techniques cited therein.

In addition, the claims recited herein are substantially similar to corresponding claims in '012, however each replacement term cited above substitutes for the term in the previously cited '012 claims. Each present claim, and its method, system, mechanism, or purpose, is substantially similar to the corresponding previously cited claim in '012, wherein only the replacement terms and their derivatives, as recited above, differ, broadening the invention.

In particular, independent claim 1 herein replaces the '012 claim 77; independent claim 3 herein replaces the '012 claim 79; independent claim 20 herein replaces the '012 claim 96; and independent claim 37 herein replaces the '012 claim 113.

For the independent claims herein, the specific replacement terms include: 1) directed digital currency; 2) purpose system; 3) directed digital currency redeemer; 4) exchange item; and 5) user.

Regarding dependent claims, claim 2 herein replaces the '012 claim 78; claim 4 herein replaces the '012 claim 80; claim 5 herein replaces the '012 claim 81; claim 6 herein replaces the '012 claim 82; claim 7 herein replaces the '012 claim 83; claim 8 herein replaces the '012 claim 84; claim 9 herein replaces the '012 claim 85; claim 10 herein replaces the '012 claim 86; claim 11 herein replaces the '012 claim 87; claim 12 herein replaces the '012 claim 88; claim 13 herein replaces the '012 claim 89; claim 14 herein replaces the '012 claim 90; claim 15 herein replaces the '012 claim 91; claim 16 herein replaces the '012 claim 92; claim 17 herein replaces the '012 claim 93; claim 18 herein replaces the '012 claim 94; claim 19 herein replaces the '012 claim 95; claim 21 herein replaces the '012 claim 97; claim 22 herein replaces the '012 claim 98; claim 23 herein replaces the '012 claim 99; claim 24 herein replaces the '012 claim 100; claim 25 herein replaces the '012 claim 101; claim 26 herein replaces the '012 claim 102; claim 27 herein replaces the '012 claim 103; claim 28 herein replaces the '012 claim 104; claim 29 herein replaces the '012 claim 105; claim 30 herein replaces the '012 claim 106; claim 31 herein replaces the '012 claim 107; claim 32 herein replaces the '012 claim 108; claim 33 herein replaces the '012 claim 109; claim 34 herein replaces the '012 claim 110; claim 35 herein replaces the '012 claim 111; claim 36 herein replaces the '012 claim 112; and claim 38 herein replaces the '012 claim 114.

The replacement terms in the present dependent claims, cited above, include: 1) directed digital currency; 2) purpose system; 3) exchange item; 4) purpose program; 5) exchange-eligible transaction; 6) exchange-eligible (exchange-eligibility), and 7) exchange fee.

In various embodiments, a DirCurrency 11 and a directed digital currency system 100 of the present invention yield several advantages, as follows.

An advantage can enable any entity, comprising a directed digital currency system 100 comprising one or more purpose systems comprising members: 1) to adopt and to issue a directed digital currency (DirCurrency 11) for any reason; 2) to offer currency system 100 exchange items; and 3) to arrange a selection of DirCurrency 11 redeemers for exchanges and benefits. An advantage can enable a purpose system to achieve its own objectives and goals of any kind via a DirCurrency 11 comprising a voucher-tag-object comprising a tag 35. An advantage can enable a purpose system to be configured to induce, motivate, or incentivize beneficial or desired behaviors among DirCurrency 11 users and potential recipients, e.g., relating to purchasing, employee productivity, conservation, education, weight loss, and the like. An advantage can enable a purpose system to control any DirCurrency 11 in multiple ways including, e.g., how, when, where, by whom, with whom, for how long, and why it can be issued to or used by a recipient or a user. An advantage can enable a purpose system to: 1) impose specific rules to be satisfied before a recipient is issued, or is qualified to receive, one or more units of a DirCurrency 11; 2) determine exchange-eligibility for specific goods and services; 3) influence timing of user behaviors; 4) control a volume of exchange items issued in a time period; and 5) control purpose system costs. An advantage can enable a purpose system or member to offer exchange items that it may not otherwise be able to offer, engendering a more effective means for achieving an objective. An advantage can enable a plurality of unaffiliated purpose systems to participate in a secure electronic network comprising a directed digital currency system 100, wherein they and their members can operate interoperably for enabling issuance, use, and redemption of a common DirCurrency 11. An advantage can enable a plurality of unaffiliated purpose systems: 1) to benefit from a central processor to manage and track units of issued DirCurrency 11; and 2) to associate disparate transactions among unaffiliated members 112, wherein transaction associating comprising query functions can determine recipient qualification and perform other useful functions. Transaction associating is a principle mechanism by which, e.g., indicators of user behaviors can be tracked and processed. An advantage can enlarge a purpose system market wherein many businesses in diverse industries, needing effective tools for achieving objectives, presently lack a capacity to offer value or incentives that would be feasible and effective, by utilizing a DirCurrency 11 and an independent networked electronic purpose processing system. An advantage can provide for an enrollment module to organize, register, and enroll existing and new currency systems and purpose systems and their members, and to configure enrollees to participate interoperably, comprising apparatuses, programs, rules, and the like. An advantage can enable a user comprising a DirCurrency 11 recipient to aggregate voucher-tag-objects from one or more unaffiliated purpose systems so as to obtain a single more desirable or valuable exchange item than may be available in an individual purpose system. An advantage can enable a user to: 1) receive and exchange voucher-tag-objects for an exchange item without necessarily enrolling or providing personal identification, using a card or an account, or a payment method or payment device; and 2) secure anonymity and privacy wherein a voucher-tag-object is not necessarily associated with or tracked to a user's behavioral history or personal identity. An advantage can provide for identifying transactions instead of personally identifying users, thereby enabling privacy and other advantages. An advantage can enable one or more DirCurrency 11 redeemers 120 to employ a no-risk marketing system to attract voucher-tag-object recipients and redeemers as new visitors and customers. An advantage can provide for collecting a fee to pay DirCurrency 11 redeemers 120 to offset costs of providing exchange items, thereby endowing DirCurrency 11 with tangible, reimbursable value.

Nomenclature

To explain the nomenclature of reference numerals used in the Figures and described in the specification, each element to which a number is assigned is illustrated as a singular item, but one or more of that element can be present. For example, purpose system 115 is one of a possible plurality of purpose systems 115. As such, drawing elements 12, 65, 102, 104, 110, 112, 120, 130, 132, 150, 807, 809, 90, 900, 902, 910, and 920 in FIG. 1 are illustrated as a singular item, but indicate one or more elements can be present. Numbered lines with arrows represent the transfer of voucher-tag-objects 12, payments, tags 35, tag-objects 60, or data, including, but not limited to, financial and non-financial transaction 80 data, tags 35, and messages 91.

Overview of the Directed Digital Currency System 100

FIG. 1 is a diagram depicting one example embodiment of a directed digital currency system 100 (a network). FIG. 1 is substantially similar to the FIG. 1 in '012, with the same elements except those noted below. For brevity of this application, definitions and descriptions of the elements of the present FIG. 1, as also set forth in FIG. 1 in '012, are incorporated herein by this reference to '012 and are adopted for the present invention without further description.

In particular, each of the following terms, comprising participating entities, is illustrated in '012 FIG. 1 blocks or is recited in at least the '012 paragraphs cited below ("paras"), or both, which are incorporated herein by this reference: 1) a network processor 102 ('012 para [0049]); 2) a network administrator 104 (para [0050]; 3) a member 112 (paras [0056]-[0057]); 5) a user 131 (para [0058]); 6) a third party 150 (para [0060]); 7) a rule 70 implementer 106 (para [0061]); and 8) a participant 101 (para [0062]).

In addition to the above-referenced description, the present FIG. 1 provides for replacing in the present invention the following elements recited in '012: 1) an interoperable reward currency system 100 ('012 para [0047]) is replaced by a directed digital currency system 100; 2) a reward system 110 (paras [0051]-[0055]) is replaced by a purpose system 115; 3) a reward provider 120 (paras [0059]; [00195]-[00204]) is replaced by a DirCurrency 11 redeemer 120; and 4) a consumer 130 (para [0058]) is replaced by a user 131. All replacement terms apply to all specification and claim references, as cited and defined. For each section below, replacement terms are listed in the order they are recited in the corresponding cited '012 section.

Embodiments of the present invention include a directed digital currency 11 (DirCurrency 11) in an interoperable directed digital currency system 100 (FIG. 1) (hereinafter "currency system 100") that has particular application in a network comprising one or more purpose systems 115, e.g., for incentivizing human behaviors desirable to participating entities.

A purpose system 115 (FIG. 1), a generic term, in a currency system 100 can comprise a group or a network of one or more members 112 (FIG. 1), businesses (not shown in FIG. 1), enterprises (not shown in FIG. 1), collaborations (not shown in FIG. 1), promotions (not shown in FIG. 1), organizations (not shown in FIG. 1), or entities (not shown in FIG. 1) that display, generate, issue, or use elements associated with a currency system 100, including one or more units of a DirCurrency 11. A purpose system 115 further comprises all of the types of entities described in '012 as a reward system 110, in paragraphs [0051]-[0055], which are incorporated herein by this reference. A purpose system 115 can further comprise a system that is associated with or uses one or more of a network processor 102, an apparatus 800, a module 801, a user interface 132, a tag 35, an element, or any methodology associated with a currency system 100 as disclosed herein. A purpose system 115 can further comprise (not shown in FIG. 1) one or more of: a business, an organization, a professional, a merchant, a service, a provider, a corporation, an employer, a manufacturer, a nonprofit, a government, a person, or an entity; a grouping of businesses organized for any purpose; a website 888; a payments or financial services firm; an airline; a chain of stores or franchises; a trade association; a consortium; a media, marketing, or advertising organization; a representative, agent, or distributor; a processor, aggregator, or other service firm; a collective effort; a computing system configured for one or more software applications; a currency system 100 client; and the like, or any combination thereof. Various purpose systems 115 can include business-consumer, peer-to-peer, employer-employee, charity-donor, teacher-student, doctor-patient, government-citizen, and similar systems. Further, a purpose system 115 can be affiliated or unaffiliated with any other purpose system 115, can have any formal or informal organizational structure, can be organized for any purpose, can be located anywhere, and can be permanent or temporary.

A DirCurrency 11 redeemer 120 (FIG. 1) is an entity that can exchange an exchange item 16 for one or more units of DirCurrency 11 comprising voucher-tag-objects 12. A DirCurrency 11 redeemer 120 can include a participant 101, a website 888 operator, and any other entity; can be located anywhere; and can be unaffiliated with a purpose system 115. A DirCurrency 11 redeemer 120 serves a different role than a member 112, however it can be a member 112, serving both roles in a currency system 100.

A user 131 (FIG. 1), a generic term, is any person or persons or entity that: 1) uses or receives or redeems a unit of a DirCurrency 11; or 2) qualifies or tries to qualify for a unit of a DirCurrency 11; or 3) engages in, or who is detected in, one or more of a transaction 80 or a behavior or an action or an interaction or a session associated with any participant 101; or 4) uses any element or feature of a currency system 100 as disclosed herein; or 5) whose user 131-associated data is used in a tag 35; or 6) activates or uses a user interface 132 or an apparatus 800; or 7) is registered, enrolled, or has an account 88 in a currency system 100; or 8) uses or receives or benefits from any type of resource, good, or service from a member 112. A user 131 can further be a person or entity tied to a participant 101 comprising one who uses or receives or benefits from an association with, or a resource provided by, a participant 101, wherein a said association or benefit or resource can comprise a good, a service, employment, information, an opportunity, and the like. A user 131 can include one or more of a consumer 130, a customer, a client, a citizen, a buyer or a purchaser, a visitor, an employee, an individual, a family, a group, a company, a volunteer, a student, a patient, a DirCurrency 11 recipient or redeemer, and the like.

Computing Machine Architecture

Figure 2A:
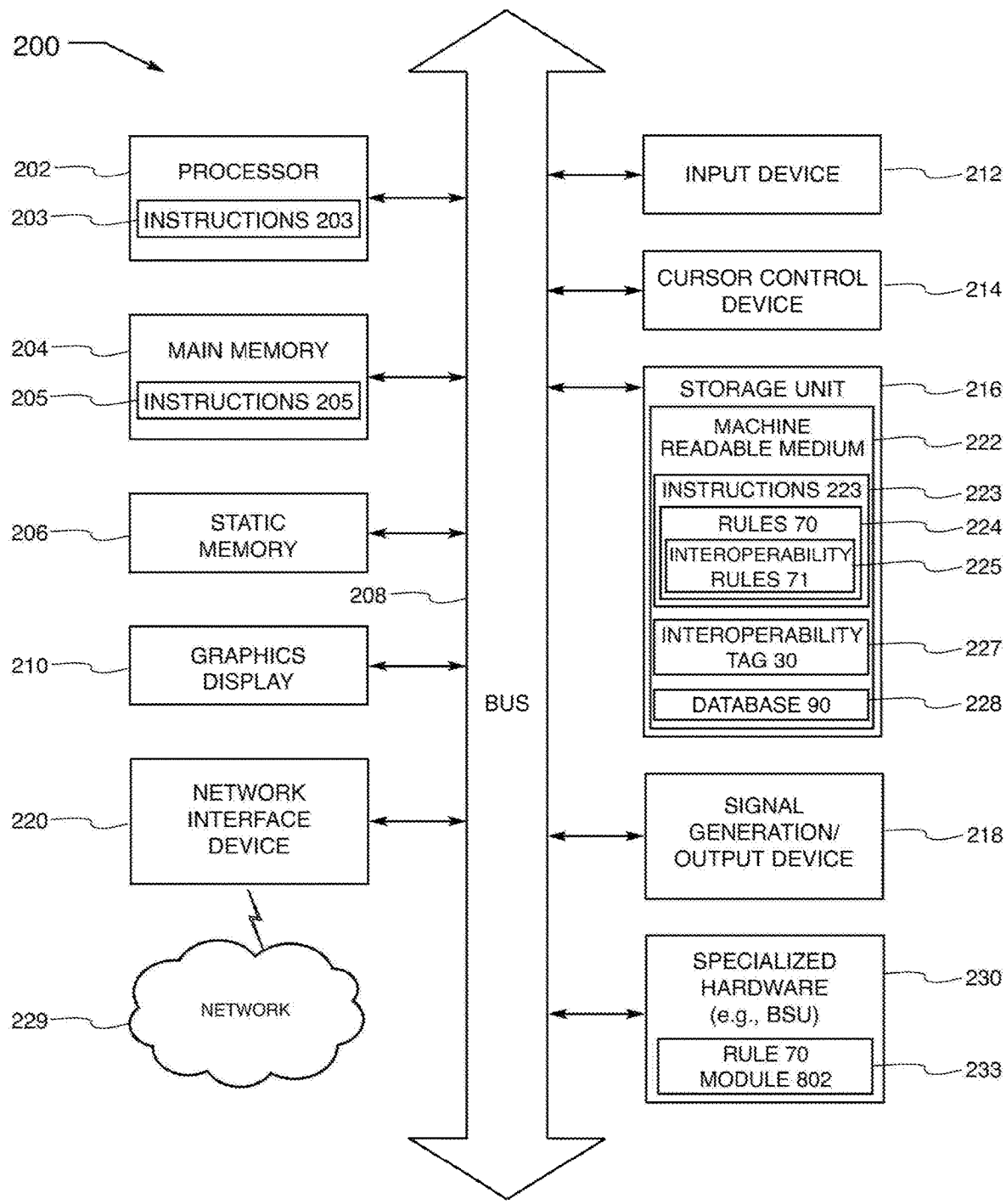
FIG. 2A illustrates, generally at 200, one embodiment of components of an example machine able to read instructions from a non-transitory machine-readable medium and execute them in a processor (or controller).

FIG. 2A is a block diagram illustrating components of an example machine, including an apparatus 800 or an article of manufacture, able to read instructions from a machine-readable medium and execute them in a processor (or controller). FIG. 2A is substantially similar to the FIG. 2A in '012, with the same elements except those noted below. For brevity of this application, definitions and descriptions of the elements of the present FIG. 2A, as also set forth in FIG. 2A in '012, are incorporated herein by this reference to '012 and are adopted for the present invention without further description.

Overview and Definitions of Additional Elements

Sections below describe elements shown in FIG. 2B, generally at 240, which illustrates relationships among example elements in currency system 100. An element in a nested box comprises a type or subset of an element in a larger box that contains it. An element illustrated as a larger box includes all nested boxes (elements) that it contains. A dotted line box indicates an element, while a solid line box indicates a category or generic type of element.

Figure 2B:
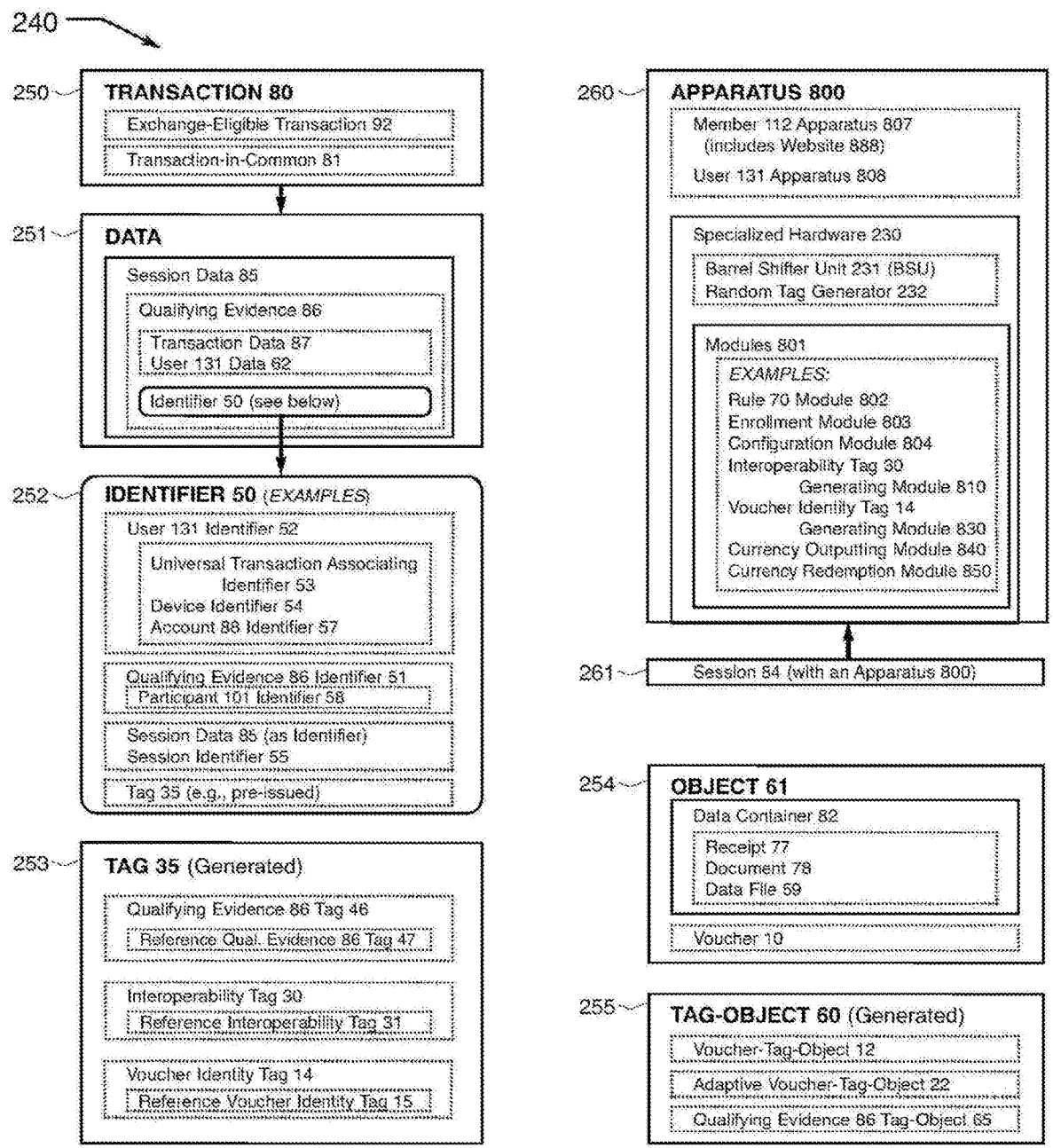
FIG. 2B illustrates, generally at 240, one embodiment of relationships among example elements in the currency system 100 shown in FIG. 1.

FIG. 2B is substantially similar to the FIG. 2B in '012, with the same elements except those noted below. For brevity of this application, definitions and descriptions of the elements of the present FIG. 2B, as also set forth in FIG. 2B in '012, are incorporated herein by this reference to '012 and are adopted for the present invention without further description.

In particular, each of the following terms, comprising participating entities, is illustrated in '012 FIG. 2B blocks or is recited in at least the '012 paragraphs cited below ("paras"), or both, which are incorporated herein by this reference: 1) an apparatus 800 ('012 para [0069]); block 260); 2) a member 112 apparatus 807 (para [0070]; block 260); 3) a user 131 apparatus 808 (para [0071]; block 260); 4) a consumer interface 132 (para [0072]; at arrows 172, 182, FIG. 1); 5) specialized hardware 230 (para [0073]; block 260); 6) a module 801 (para [0074]; block 260); 7) an enrollment module 803 (para [0075]; block 260; and block 308, FIG. 3B); 8) a configuration module 804 (para [0076]; block 260; and block 309, FIG. 3B); 9) a currency outputting module 840 (paras [0077]; block 260; and block 5800, FIG. 5C); 10) a currency redemption module 850 (paras [0078]; block 260; and block 720, FIG. 7); 11) an interoperability tag 30 generating module 810 (para [0079]; block 413, FIG. 4B; and block 5004, FIG. 5A); 12) a qualifying evidence 86 tag 46 generating module 812 (para [0079]; block 406, FIG. 4A; and block 5040, FIG. 5A); 13) a qualifying evidence 86 tag-object 65 generating module 814 (para [0079]; block 408, FIG. 4A; and block 5050, FIG. 5A); 14) a qualifying evidence 86 tag-object 65 detecting module 822 (para [0079]; block 5110, FIG. 5B); 15) an exchange-eligibility detecting module 826 (para [0079]; not shown in Figures); 16) a voucher identity tag 14 generating module 830 (para [0079]; block 411, FIG. 4B; and block 5600, FIG. 5C); 17) a transaction 80 module (para [0079]; not shown in Figures); 18) a qualification requirement 89-setting module (para [0079]; not shown in Figures); 19) a transaction associating module (para [0079]; not shown in Figures); 20) a session 84 (para [0080]; block 261, FIG. 2B).

In addition to the above-referenced description, the present FIG. 2B provides for replacing the following elements: 1) a reward eligibility detecting module 826 is replaced by an exchange-eligibility detecting module 826.

An exchange-eligibility detecting module 826 (not shown in Figures) can screen transactions 80 to select tagged exchange-eligible transactions 92 by detecting an exchange-eligibility tag 33 (not shown in Figures), a type of tag 35. For example, a merchant 112 can promote certain merchandise by marking items as exchange-eligible, while rendering other items exchange-ineligible. To do so, a merchant 112 can: 1) designate items with an exchange-eligibility tag 33 on price tags, merchandise, receipts 77, signs, etc.; 2) configure its point of sale or inventory system to process products and services as exchange-eligible in databases 90; 3) advertise items as exchange-eligible; 4) selectively promote specific items; and 5) collect funding for associated marketing costs from a third party 150.

In addition, each of the following terms, in general comprising transaction 80-related elements, is illustrated in '012 FIG. 2B blocks or is recited in at least the '012 paragraphs cited below ("paras"), or both, which are incorporated herein by this reference: 1) a transaction 80 ('012 para [0081]; block 250); and 2) a transaction-in-common 81 (para [0083]; block 250).

In addition to the above-referenced description, the present FIG. 2B provides for replacing the following elements: 1) a reward-eligible transaction 92 (para [0082]; block 250) is replaced by an exchange-eligible transaction 92.

An exchange-eligible transaction 92 (FIG. 2B, block 250) comprises a type of transaction 80 wherein some items can be designated as eligible for exchange while others are ineligible.

In addition, each of the following terms, in general comprising data-related elements, is illustrated in '012 FIG. 2B blocks or is recited in at least the '012 paragraphs cited below ("paras"), or both, which are incorporated herein by this reference: 1) session data 85 ('012 para [0084]; block 251; block 404, FIG. 4A; and block 5032, FIG. 5A); 2) qualifying evidence 86 (para [0085]; block 251; and block 403, FIG. 4A); 3) transaction data 87 (para [0086]; block 251); 4) user 131 data (para [0087]); 5) session information (para [0088]); 6) a string 83 (para [0089]; not shown in FIG. 2B); 7) an identifier 50 (paras [0090]-[0094]; block 252); 8) a user 131 identifier 52 (para [0095]; block 252; and block 404, FIG. 4A); 9) a universal transaction associating identifier 53 (para [0096]; block 252); 10) a device identifier 54 (para [0097]; block 252); 11) an account 88 identifier 57 (para [0098]; block 252); 12) a session identifier 55 (para [0099]); 13) a tag 35 (para [00100]; block 253); 14) a qualifying evidence 86 tag 46 (para [00101]; block 253; block 407, FIG. 4A; and block 5042, FIG. 5A); 15) a reference qualifying evidence 86 tag 47 (para [00102]; block 253); 16) an interoperability tag 30 (para [00103]; block 227; FIG. 2A; block 253, FIG. 2B; block 414, FIG. 4B; block 5006, FIG. 5A); 17) a reference interoperability tag 31 (para [00104]; block 253); 18) a voucher identity tag 14 (para [00105]); and 19) a reference voucher identity tag 15 (para [00106]).

In addition, each of the following terms, in general comprising object-related elements, is illustrated in '012

FIG. 2B blocks or is recited in at least the '012 paragraphs cited below ("paras"), or both, which are incorporated herein by this reference: 1) an object 61 ('012 para [00107]; block 254); 2) a data container 82 (para [00108]; block 254; block 405, FIG. 4A; and block 5034, FIG. 5A); 3) a data file 59 (para [00109]; block 254; and block 405, FIG. 4A); 4) a voucher 10 (para [00110]; block 254; and block 410, FIG. 4B); 5) a tag-object 60 (para [00111]; block 255); 6) a voucher-tag-object 12 (para [00112]; block 255; block 416, FIG. 4B; and block 5810, FIG. 5C); 7) an adaptive voucher-tag-object 22 (para [00113]; block 255; and arrows 5452, 5454, FIG. 5B); and 8) a qualifying evidence 86 tag-object 65 (para [00114]; block 255; block 409, FIG. 4A).

In addition, each of the following terms, in general comprising additional elements, is illustrated in '012 FIG. 2B blocks or is recited in at least '012 paragraphs cited below ("paras"), or both, which are incorporated herein by this reference: 1) a rule 70 (para [00118]; block 5510, FIG. 5C); 2) a qualification requirement 89 (para [00119]; block 5210, FIG. 5B); 3) a voucher fee 18 (para [00120]; block 5830, FIG. 5C); 4) a database 90 (para [00120]; FIG. 1); 8) an account 88 (para [00123]; and 5) a message 91 (para [00124]; at arrows 5452, 5454, FIG. 5B).

Figure 7:
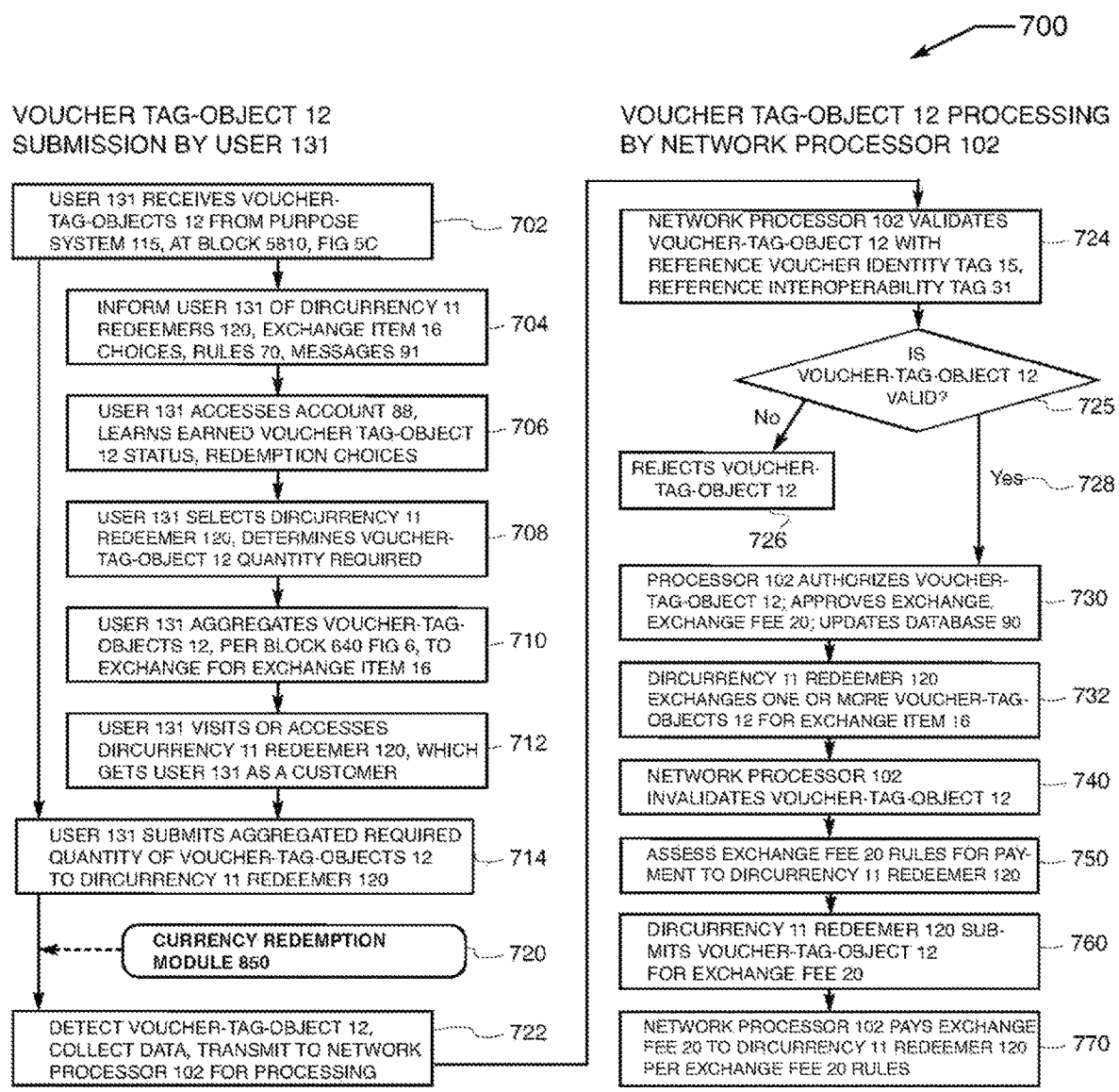
FIG. 7 is a flowchart illustrating, generally at 700, a detailed example process designed to redeem voucher-tag-objects in the currency system 100 shown in FIG. 1.

In addition to the above-referenced description, the present FIG. 2B provides for replacing the following elements: 1) an interoperable reward currency 11 ('012 para [00115]) is replaced by a DirCurrency 11; 2) a reward 16 (para [00116]; block 732, FIG. 7) is replaced by an exchange item 16; 3) a reward program 108 (para [00117]; not shown in Figures) is replaced by a purpose program 108; 6) a reward fee 20 is replaced by an exchange fee 20 (blocks 750, 760, 770, FIG. 7).

A DirCurrency 11 comprises one or more of a unit of directed digital currency 11 as disclosed herein.

Figure 6:
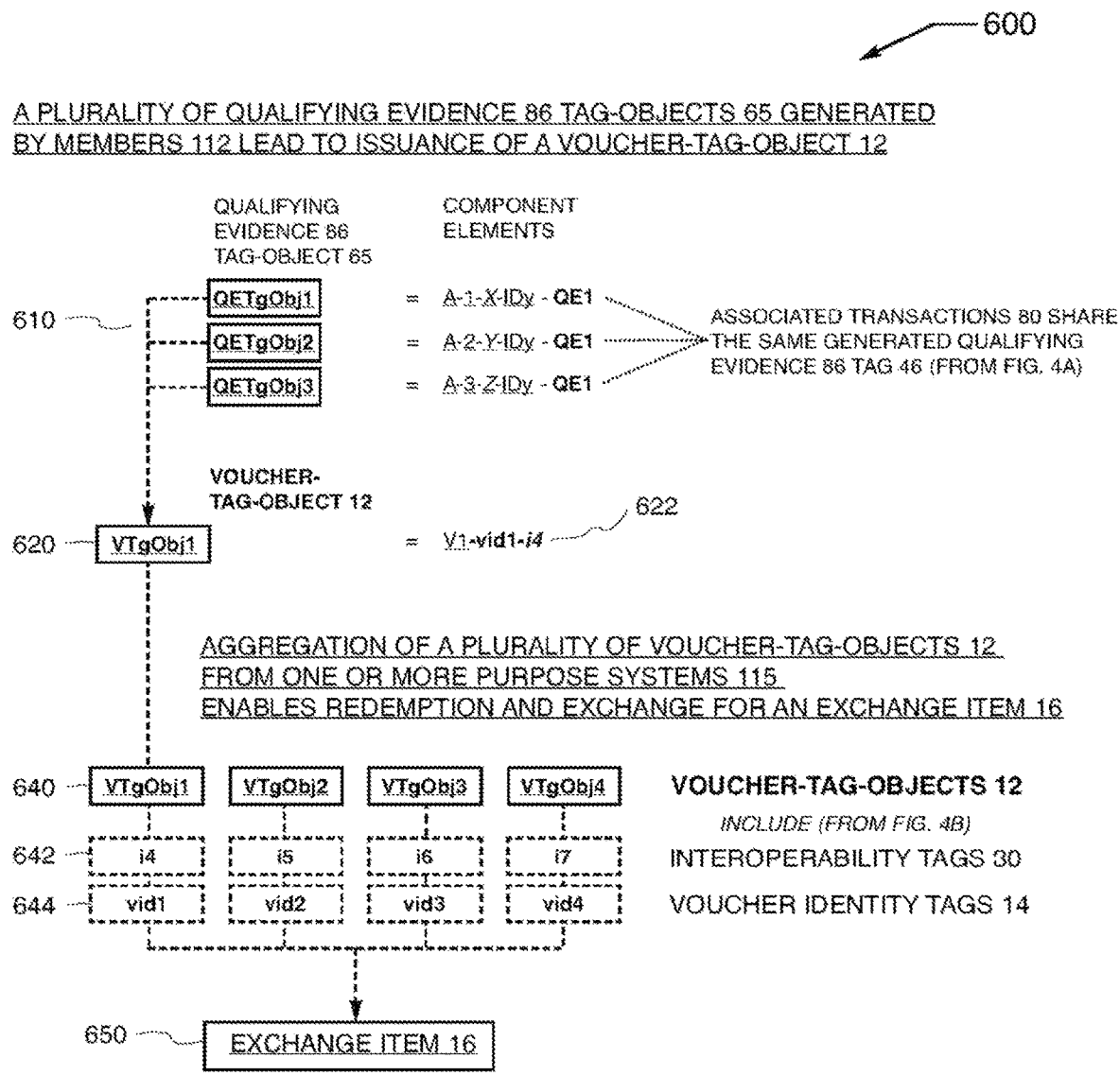
FIG. 6 illustrates, generally at 600, example elements of a simplified voucher-tag-object generation-redemption process in the currency system 100 shown in FIG. 1.

An exchange item 16 (FIG. 6, block 650; FIG. 7, blocks 710, 732) can be any item, inducement, or incentive that is directed toward steering or modifying human behavior, including any consideration, value, recognition, benefit, and the like, including anything that can stimulate the biological reward system in a human to pursue or engage in a behavior. An exchange item 16 can comprise a reward 16 as recited in '012. An exchange item 16 can further comprise any useful value employed for any purpose, including a product, a service, a meal, food, an experience, entertainment, information, a "like," an entry (e.g., an event or a sweepstakes), a ticket, a coupon, a discount, cash, a credit, cash back, points, miles, data, or anything of real or perceived value to a user 131. As an exchange item, data can include a download (e.g., a movie, music, or image) or a service such as analyses, information, advice, and news. An exchange item 16 can further consist of one or more items, partial items, enhancements, and the like. In some embodiments, an exchange item 16 can be tangible, real, or yield a real tangible result. Each exchange item 16 comprises or can be associated with a physical or tangible voucher-tag-object 12, a tag 35, an object 61, or an element. An exchange item 16 can further comprise a unit of a DirCurrency 11, an object 61, or other currency system 100 element. Purposes of an exchange item 16 typically can comprise an incentive, an inducement, a motivator, a payment, compensation, a bonus, remuneration, an honor, and the like, for engaging in a desired tangible behavior, e.g., spending, visiting, performing, acting, achieving goals, refraining from acting, acts, services, volunteering, compliance, and the like. A tag 35 can be configured for enabling virtually any aspect of an exchange item 16 or a DirCurrency 11.

A purpose program 108 (FIG. 3B, block 316) can be any promotion, program, system, procedure, or endeavor wherein a purpose system 115 establishes parameters, including qualification requirements 89, rules 70, a time period, and the like, that enable issuance of one of more units of DirCurrency 11 exchangeable for an exchange item 16.

Figure 3A:
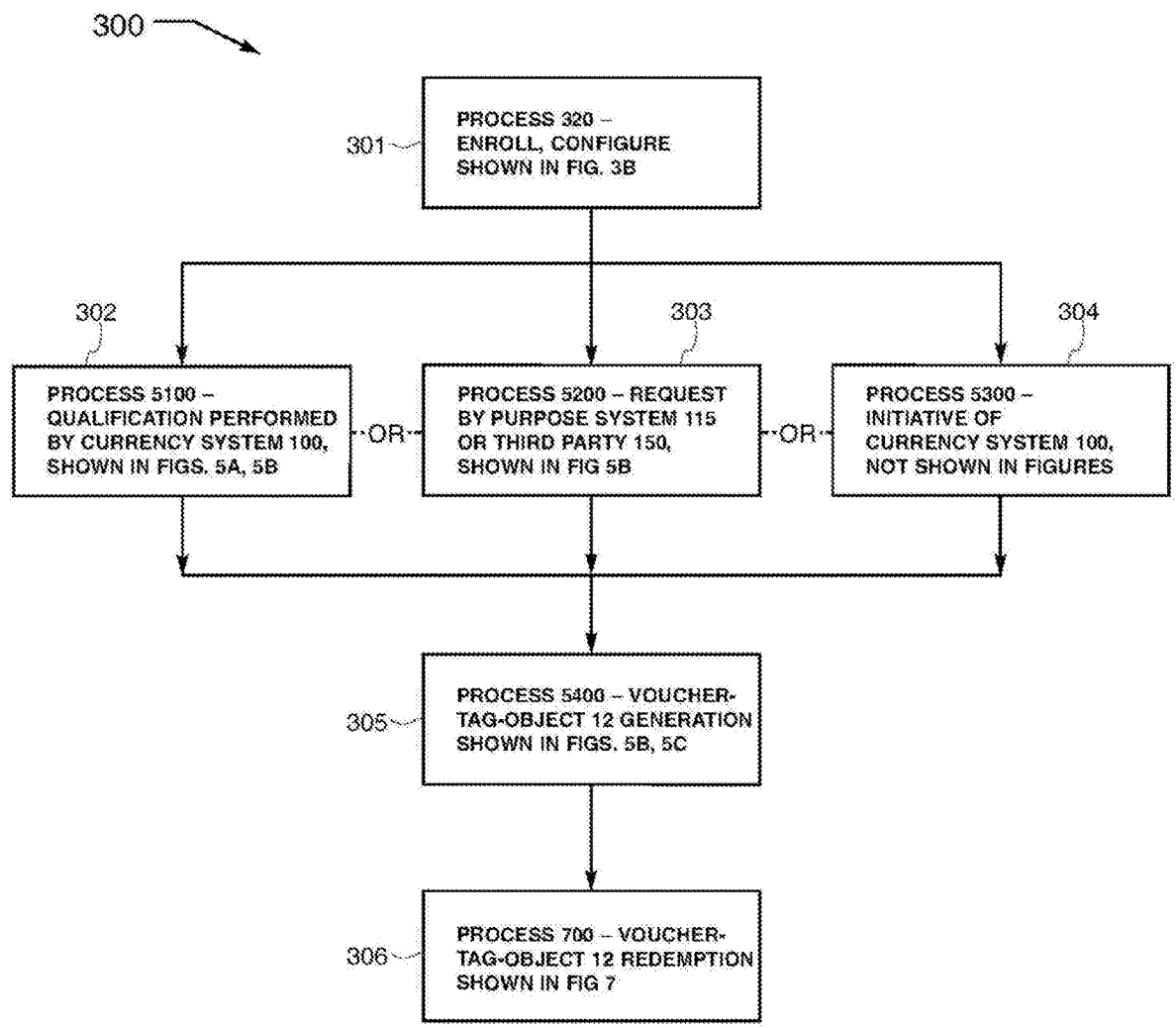
FIG. 3A is a flowchart illustrating, generally at 300, an overview of example processes in the currency system 100 shown in FIG. 1.
Figure 3B:
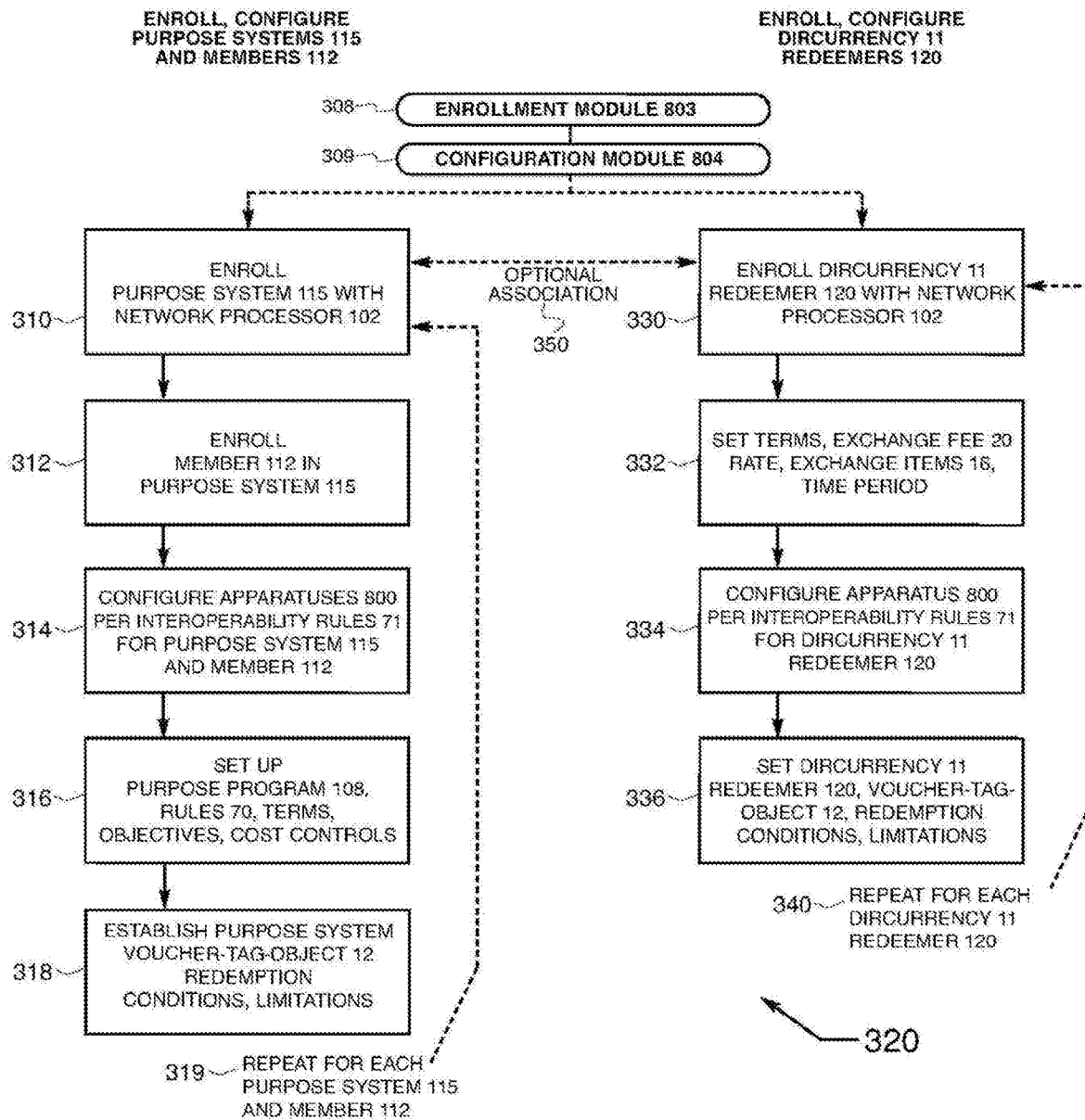
FIG. 3B is a flowchart illustrating, generally at 320, one embodiment showing example processes designed to enroll participants and configure the currency system 100.

An exchange fee 20 (FIG. 3B, block 332; FIG. 7, blocks 730, 760, 770) can be a fee disbursed to a DirCurrency 11 redeemer 120, as further described in '012 in reference to a reward fee 20.

In addition, each of the following terms, in general comprising interoperability, is illustrated in '012 FIG. 2B blocks or is recited in at least '012 paragraphs ("paras"), or both, as cited below, which are incorporated herein by this reference: 1) interoperable, interoperably, and interoperability in their respective contexts ('012 paras [00125]-[00138]).

Currency System 100 is Directed Toward a Tangible Embodiment

U.S. patent application '012 discloses a section entitled "CURRENCY SYSTEM 100 IS DIRECTED TOWARD A TANGIBLE EMBODIMENT." The entirety of this '012 section is incorporated herein by this reference, however for this section the following elements are substituted, as described above: 1) a reward provider 120 is replaced by a DirCurrency 11 redeemer 120; 2) a reward 16 is replaced by an exchange item 16; and 3) a reward system 110 is replaced by a purpose system 115.

Financial Aspects of the Currency

U.S. patent application '012 discloses a section entitled "FINANCIAL ASPECTS OF THE CURRENCY." The entirety of this '012 section is incorporated herein by this reference, however for this section the following elements are substituted, as described above: 1) a reward fee 20 is replaced by an exchange fee 20; 2) a reward provider 120 is replaced with a DirCurrency 11 redeemer 120; 3) a reward 16 is replaced by an exchange item 16; 4) a reward system 110 is replaced by a purpose system 115; 5) a reward eligibility detecting module 826 is replaced by exchange eligibility detecting module 826; 6) a reward-eligible transaction 92 is replaced by an exchange-eligible transaction 92; 7) a reward-eligibility tag 33 is replaced by an exchange-eligibility tag 33; and 8) reward-eligible is replaced by exchange-eligible.

Data Mining, Analytics, and Reports

U.S. patent application '012 discloses a section entitled "DATA MINING, ANALYTICS, AND REPORTS." The entirety of this '012 section is incorporated herein by this reference, however for this section the following elements are substituted, as described above: 1) a reward provider 120 is replaced by a DirCurrency 11 redeemer 120; 2) a reward 16 is replaced by an exchange item 16; 3) a reward system 110 is replaced by a purpose system 115; and 4) a reward provider 120 is replaced with a DirCurrency 11 redeemer 120.

Overview of Currency System 100 Processes

Referring now to FIG. 3A, U.S. patent application '012 discloses a section entitled "OVERVIEW OF CURRENCY SYSTEM 100 PROCESSES." The entirety of this '012 section is incorporated herein by this reference, however for this section the following elements are substituted, as described above: 1) a reward 16 is replaced by an exchange item 16; and 2) a reward system 110 is replaced by a purpose system 115. FIG. 3A shows these changes.

Example Enrollment and Configuring Process

Referring now to FIG. 3B, U.S. patent application '012 discloses a section entitled "EXAMPLE ENROLLMENT AND CONFIGURING PROCESS." The entirety of this '012 section is incorporated herein by this reference, however for this section the following elements are substituted, as described above: 1) a reward system 110 is replaced by a purpose system 115; 2) a reward provider 120 is replaced by a DirCurrency 11 redeemer 120; 3) a reward fee 20 is replaced by an exchange fee 20; and 4) a reward 16 is replaced by an exchange item 16. FIG. 3B shows these changes.

First Example Implementation

Referring now to FIG. 3B, U.S. patent application '012 discloses a section entitled "FIRST EXAMPLE IMPLEMENTATION." The entirety of this '012 section is incorporated herein by this reference, however for this section the following elements are substituted, as described above: 1) a reward system 110 is replaced by a purpose system 115; 2) a reward program 108 is replaced by a purpose program 108; 3) a reward provider 120 is replaced by a DirCurrency 11 redeemer 120; 4) a reward currency 11 is replaced by a DirCurrency 11; 5) a reward 16 is replaced by an exchange item 16; 6) reward-eligible is replaced by exchange-eligible; 7) reward-ineligible is replaced by exchange-ineligible; and 8) a reward fee 20 is replaced by an exchange fee 20. FIG. 3B shows these changes.

Additional Example Implementations

Referring now to FIG. 1, U.S. patent application '012 discloses a section entitled "ADDITIONAL EXAMPLE IMPLEMENTATIONS." The entirety of this '012 section is incorporated herein by this reference, however for this section the following elements are substituted, as described above: 1) a reward system 110 is replaced by a purpose system 115; 2) a reward 16 is replaced by an exchange item 16; 3) a reward fee 20 is replaced by an exchange fee 20; and 4) a reward currency 11 is replaced by a DirCurrency 11. FIG. 1 shows these changes.

Example Qualifying Evidence 86 Tag-Object 65 Generation Process

Figure 4A:
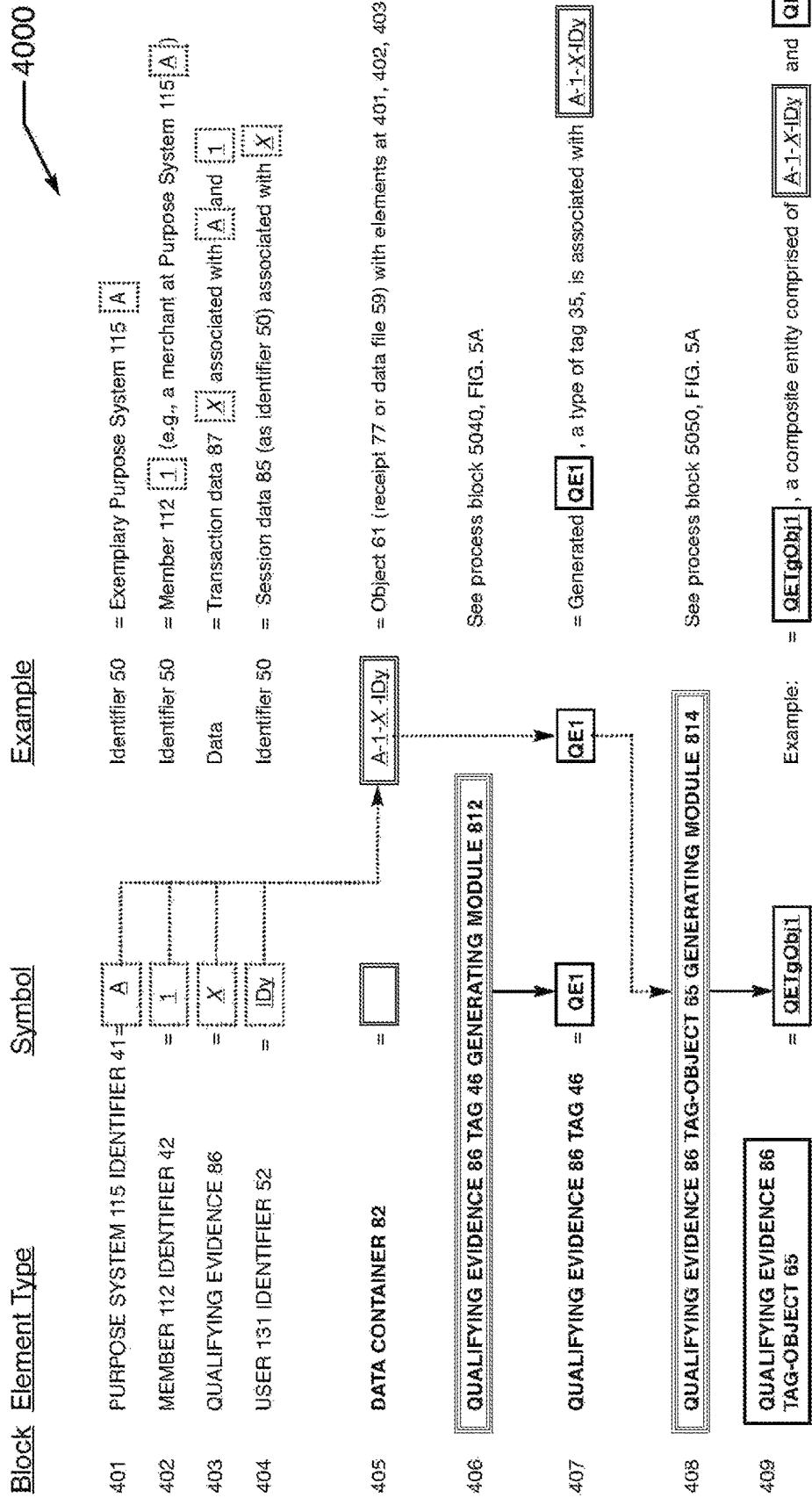
FIG. 4A illustrates, generally at 4000, an example process and selected elements for generating a qualifying evidence tag-object in the currency system 100 shown in FIG. 1.

Referring now to FIG. 4A, U.S. patent application '012 discloses a section entitled "EXAMPLE QUALIFYING EVIDENCE 86 TAG-OBJECT 65 GENERATION PROCESS." The entirety of this '012 section is incorporated herein by this reference, however for this section the following elements are substituted, as described above: 1) a reward system 110 identifier 41 is replaced by a purpose system 115 identifier 41; and 2) a reward system 110 is replaced by a purpose system 115. FIG. 4A shows these changes.

Example Voucher-Tag-Object 12 Generation Process

Figure 4B:
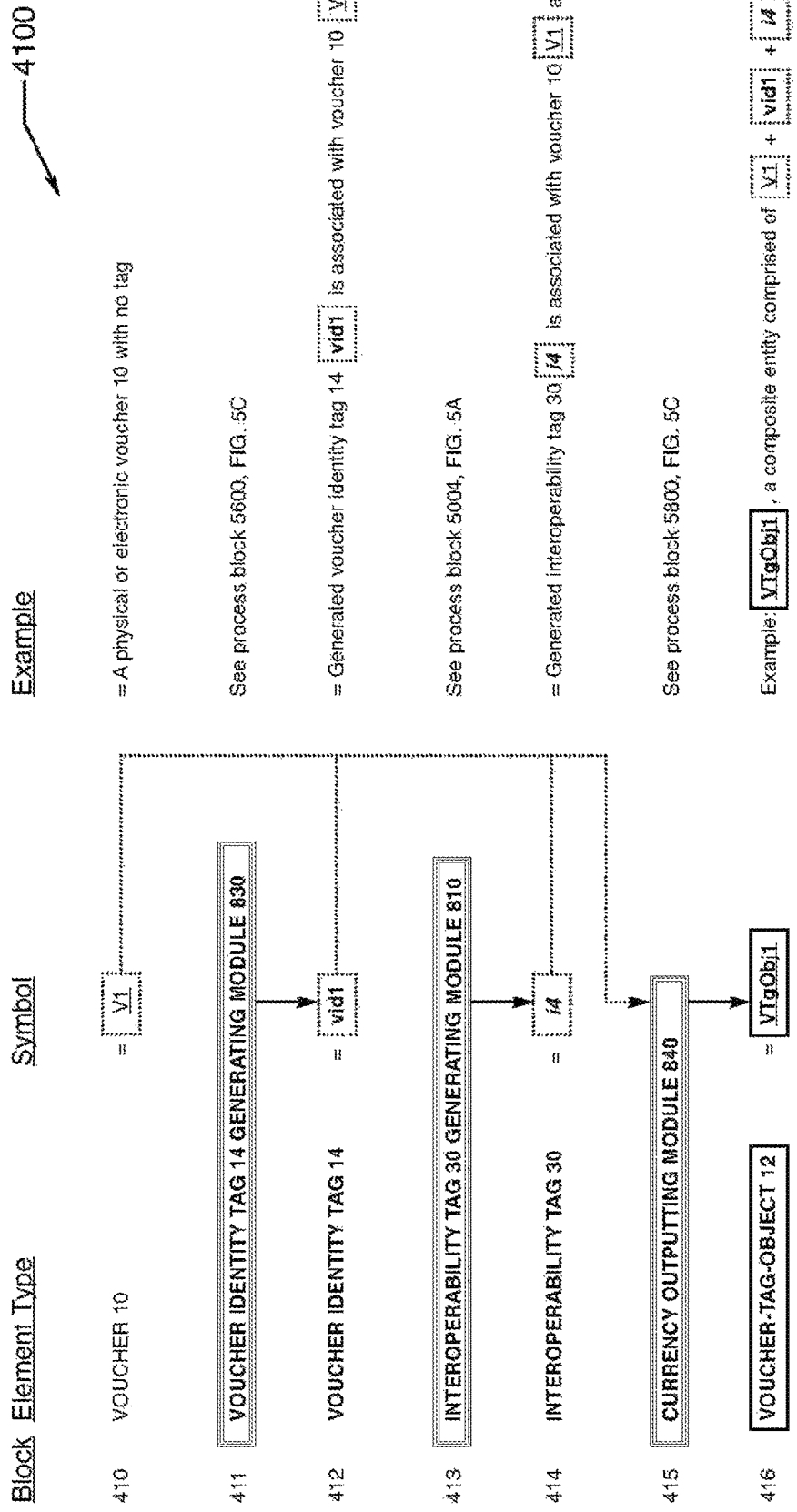
FIG. 4B illustrates, generally at 4100, an example process and selected elements for generating a voucher-tag-object 12 in the currency system 100 shown in FIG. 1.

Referring now to FIG. 4B, U.S. patent application '012 discloses a section entitled "EXAMPLE VOUCHER-TAG-OBJECT 12 GENERATION PROCESS." The entirety of this '012 section is incorporated herein by this reference, however for this section the following elements are substituted, as described above: 1) a reward currency 11 is replaced by a DirCurrency 11; 2 a reward 16 is replaced by an exchange item 16; 6) reward-eligible is replaced by exchange-eligible; and 3) a reward provider 120 is replaced by a DirCurrency 11 redeemer 120. FIG. 4B shows these changes.

Example Databases in Currency System 100

Referring now to FIG. 4C, U.S. patent application '012 discloses a section entitled "FIRST EXAMPLE IMPLEMENTATION." The entirety of this '012 section is incorporated herein by this reference. No elements are substituted. FIG. 4C shows these elements.

Example Voucher-Tag-Object 12 Generation/Qualification Process

Figure 5A:
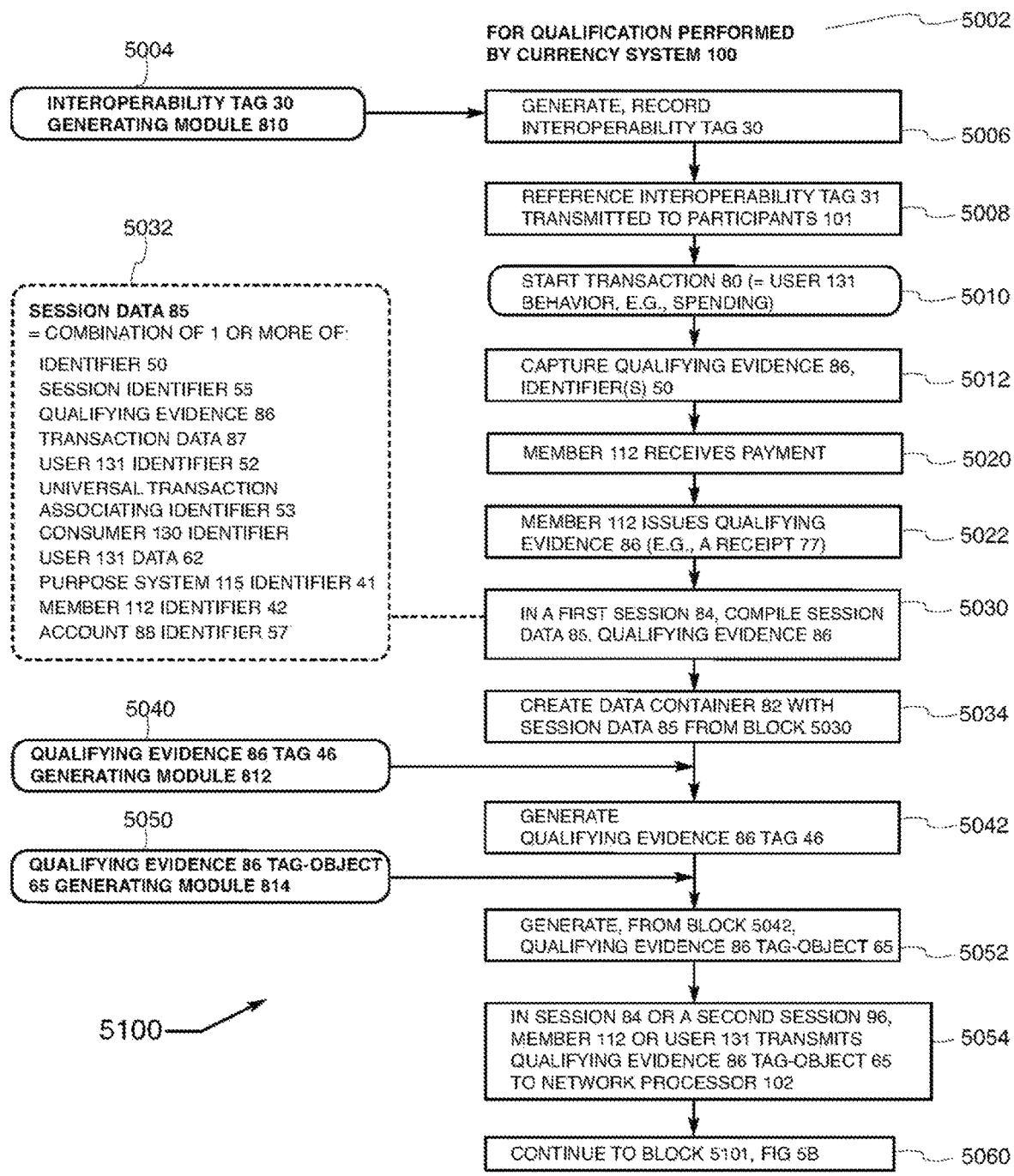
FIG. 5A is a flowchart illustrating, generally at 5100, an example process, in a first part, designed for qualification for a voucher-tag-object in the system shown in FIG. 1.

Referring now to FIG. 5A (coupled with FIGS. 5B and 5C), U.S. Patent Application '012 discloses a section entitled "EXAMPLE PROCESS TO QUALIFY FOR A VOUCHER-TAG-OBJECT 12." The entirety of this '012 section is incorporated herein by this reference, however for this section the following elements are substituted, as described above: 1) reward qualification is replaced by qualification; and 2) a reward system 110 identifier 41 is replaced by a purpose system 115 identifier 41. FIG. 5A shows these changes. A qualification in the present invention is not limited to a reward qualification. A DirCurrency 11 issuer can issue units of a DirCurrency 11 for any reason to any person with or without a qualification.

Figure 5B:
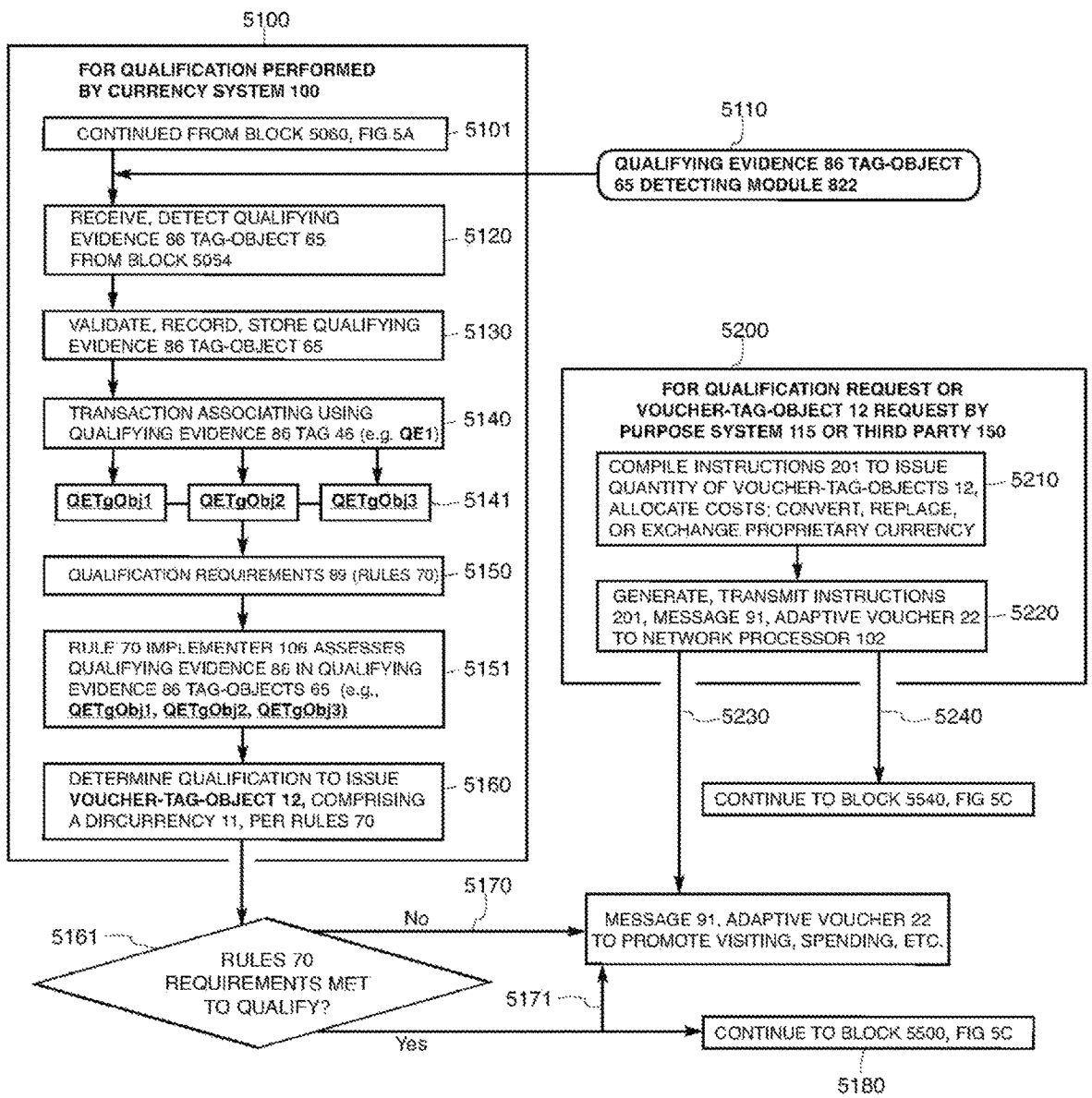
FIG. 5B is a flowchart, generally at 5100, in a second part as a continuation of FIG. 5A, illustrating an example process designed for qualification for a voucher-tag-object.

Referring now to FIG. 5B, U.S. patent application '012 discloses a section entitled "EXAMPLE PROCESS TO QUALIFY FOR A VOUCHER-TAG-OBJECT 12." The entirety of this '012 section is incorporated herein by this reference, however for this section the following elements are substituted, as described above: 1) reward qualification is replaced by qualification; and 2) a reward system 110 is replaced by a purpose system 115. FIG. 5B shows these changes.

Figure 5C:
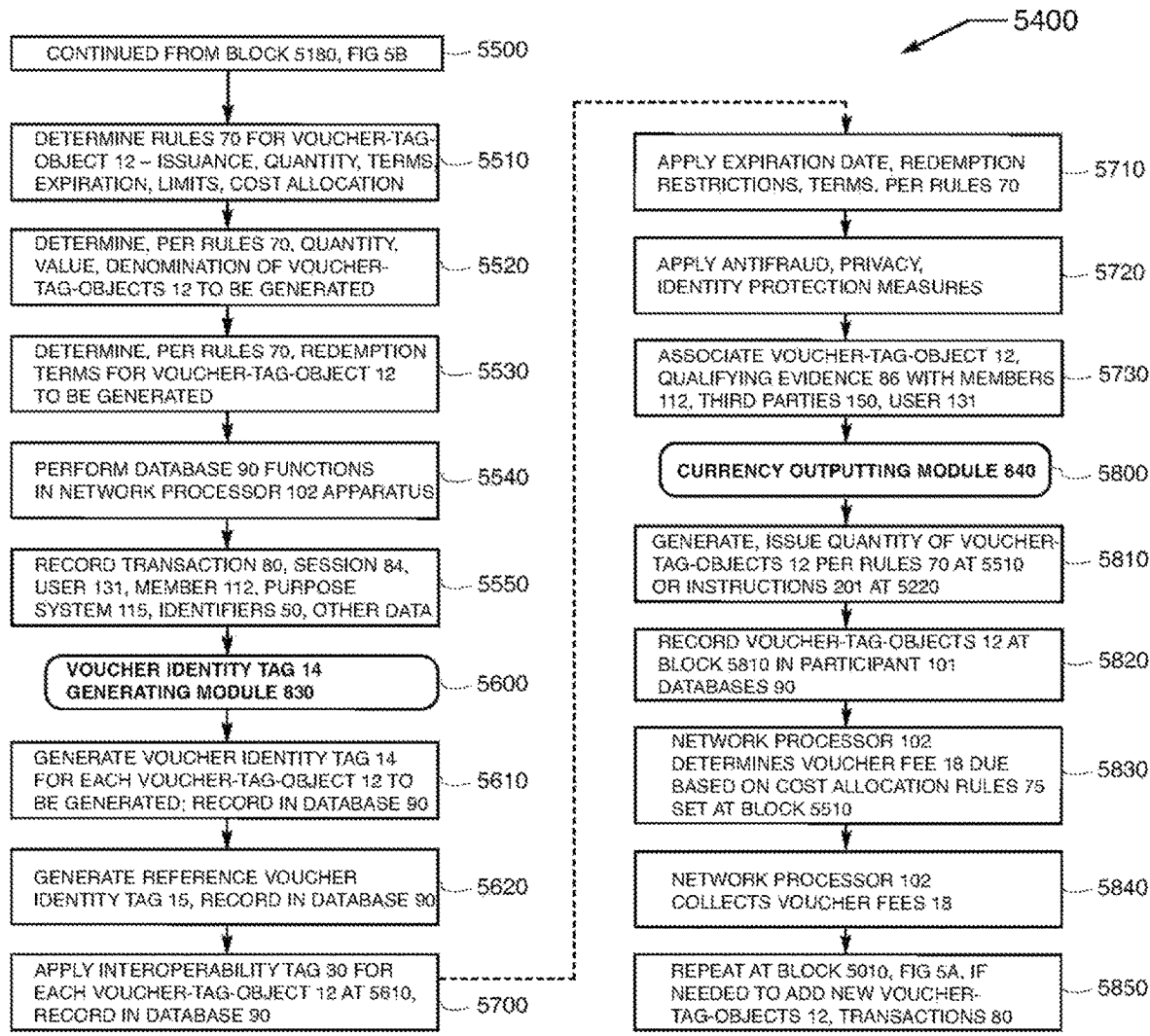
FIG. 5C is a flowchart, generally at 5400, as a continuation of processes 5100 and 5200 in FIG. 5B, illustrating an example process designed for generating a voucher-tag-object in the system shown in FIG. 1.

Referring now to FIG. 5C, U.S. patent application '012 discloses a section entitled "EXAMPLE PROCESS TO GENERATE VOUCHER-TAG-OBJECT 12 (continued)." The entirety of this '012 section is incorporated herein by this reference, however for this section the following elements are substituted, as described above: 1) a reward system 110 is replaced by a purpose system 115. FIG. 5C shows this change.

Further in reference to FIG. 5C block 5820, a tag 35 comprising a voucher-tag-object 12 can be recorded and stored in a database 90 consisting of one or more tables, records, columns, and cells (fields). The coupled (combined) elements in a tag 35 can be stored in a database 90 in a format, e.g., of: 1) a contiguous string 83 recorded in one cell in a table column (e.g., a tag 35 comprising a "segment A" comprising all elements recorded in one column); or 2) a non-contiguous string 83 recorded as individual segments, comprising portions of a string 83, in two or more columns, the segments coupled as a combination (e.g., a single "segment B" in a first column and a single "segment C" in a second column); or as 3) a non-contiguous string 83 comprising a set of elements recorded as entries in two or more table columns, each entry comprising a segment of a single tag 35, wherein in at least one table column at least two elements comprise at least one segment and two or more segments in different columns can operate as a coupled combination (e.g., a coupled "segment A" in a first column, a single element as a "segment B" in a second column, and a single element as a "segment C" in a third column).

Example Elements in a Voucher-Tag-Object 12 Redemption Process

Referring now to FIG. 6, U.S. patent application '012 discloses a section entitled "EXAMPLE ELEMENTS IN A VOUCHER-TAG-OBJECT 12 REDEMPTION PROCESS." The entirety of this '012 section is incorporated herein by this reference, however for this section the following elements are substituted, as described above: 1) a reward 16 is replaced by an exchange item 16; and 2) a reward system 110 is replaced by a purpose system 115. FIG. 6 shows these changes.

Example Voucher-Tag-Object 12 Redemption Process 700

Referring now to FIG. 7, U.S. patent application '012 discloses a section entitled "EXAMPLE VOUCHER-TAG-OBJECT 12 REDEMPTION PROCESS 700." The entirety of this '012 section is incorporated herein by this reference, however for this section the following elements are substituted, as described above: 1) a reward provider 120 is replaced by a DirCurrency 11 redeemer 120; 2) a reward 16 is replaced by an exchange item 16; 3) reward program 108 rules are replaced by purpose program 108 rules; 4) a reward currency 11 is replaced by a DirCurrency 11; 5) a reward system 110 is replaced by a purpose system 115; 6) a reward fee 20 rule is replaced by an exchange fee 20 rule; and 7) a reward fee 20 is replaced by an exchange fee 20. FIG. 7 shows these changes.

Voucher-Tag-Object 12 Sales, Trade, and Distribution

U.S. patent application '012 discloses a section entitled "VOUCHER-TAG-OBJECT 12 SALES, TRADE, AND DISTRIBUTION." The entirety of this '012 section is incorporated herein by this reference, however for this section the following elements are substituted, as described above: 1) a reward provider 120 is replaced by a DirCurrency 11 redeemer 120; 2) a reward system 110 is replaced by a purpose system 115; and 3) a reward currency is replaced by a directed digital currency.

Additional Configuration Considerations

U.S. patent application '012 discloses a section entitled "ADDITIONAL CONFIGURATION CONSIDERATIONS." The entirety of this '012 section is incorporated herein by this reference, however for this section the following elements are substituted, as described above: 1) a reward system 110 is replaced by a purpose system 115; 2) a reward provider 120 is replaced by a DirCurrency 11 redeemer 120; 3) a reward 16 is replaced by an exchange item 16; and 4) a reward currency 11 is replaced by a DirCurrency 11.

Upon reading this disclosure, those of skill in the art will appreciate still additional alternative structural and functional designs for a system, an apparatus, and a process for electronically generating a general DirCurrency 11, comprising voucher-tag-objects 12, exchange items 16, tags 35, and tag-objects 60 through the disclosed principles herein. Thus, while particular embodiments and applications have been illustrated and described, it is to be understood that the disclosed embodiments are not limited to the precise construction and components disclosed herein, and the disclosure is to be accorded the widest scope consistent with the principles and features disclosed herein. Various modifications, changes and variations, which will be apparent to those skilled in the art, can be made in the arrangement, operation, and details of the methods and apparatuses disclosed herein without departing from the spirit and scope defined in the appended claims. The above description of the disclosed embodiments is provided to enable any person of ordinary skill in the art to make or use the disclosure.

What is claimed is:

1. An apparatus comprising:
a user interface; and
at least one currency outputting module for generating at least one of a unique tag and a corresponding tag-object, configured in accordance with at least one interoperability rule; and
a network processor associated with the at least one currency outputting module and further associated with a currency system comprising a computer network and further comprising a computer system and further comprising at least one of a plurality of disparate groups comprising at least one of a plurality of unaffiliated and affiliated purpose systems and further comprising participants and further comprising at least one of a participant comprising at least one of a member and a directed digital currency redeemer having at least one of a physical location and a web site; and
a machine readable non-transitory medium coupled to the network processor, the machine readable non-transitory medium comprising:
a rule module associated with the at least one interoperability rule; and
a unique tag embodied thereon for executing the at least one interoperability rule; and
a first database comprising at least one of a plurality of database records, each database record corresponding to at least one unit of a plurality of units of a directed digital currency; and
at least one instruction embodied thereon, executable by the network processor communicatively coupled to the user interface and the rule module and the unique tag; and
wherein the at least one instruction, when executed causes the network processor to:
configure the apparatus and the computer network for interoperability of at least one unit of a plurality of units of a directed digital currency among the at least one of a plurality of unaffiliated and affiliated purpose systems in the computer network; and
generate in the non-transitory machine readable medium, in accordance with the at least one interoperability rule, a first unique tag comprising a string, the first unique tag associated with a unit of the plurality of units of the directed digital currency, the string further comprising a coupling of elements, the elements comprising:
1) an interoperability tag for a plurality of units of the directed digital currency, and further comprising at least one of:
2) a unique identifier comprising a voucher identity tag for each unit of the plurality of units of the directed digital currency; and 3) additional data comprising:
   a) data comprising one of transaction data tied to at least one of (i) a transaction, comprising a behavior or an act, and (ii) a session and (iii) qualifying evidence, the qualifying evidence associated with a first user comprising a user identifier and further comprising one of a purpose system and a participant; and further comprising
   b) a code, comprising one of an identifier and a tag and a network processor-generated code; and
4) a rule, comprising a direction toward a purpose; and
5) an instruction, comprising a direction toward a purpose; and
6) example element for executing at least one computer operation comprising a process, the example element comprising a matching of database elements, each unit of the directed digital currency comprising at least one of a plurality of forms or embodiments of an association of the generated first unique tag and a corresponding object comprising a physical or a digital tag-object; and each tag-object comprising a) a composite entity comprising an article of manufacture, and further comprising b) an embodiment of value comprising a unit of exchange interoperable in the computer network, and further comprising c) a corresponding entry in at least one database record;
   the embodiment of value comprising any kind of value for any purpose that can be one or more of conveyed and directed and stored and exchanged for an exchange item, the first unique tag further comprising a computer methodology for enabling at least one computer operation for any purpose via the first unique tag, the computer methodology comprising:
   at least one feature, associated with each unit of the plurality of units of the directed digital currency, comprising an enabling of, and further comprising a capability for, an executing of at least one computer operation via the first unique tag, and further comprising
   a matching of elements in the plurality of database records, the elements comprising the data and further comprising the example element, irrespective of the at least one of a plurality of forms or embodiments of a unit of the directed digital currency, and further comprising
   a reference tag, and further comprising
   a module, comprising the network processor, for executing an at least one computer operation via an at least one unique tag, the at least one computer operation comprising:
   one or more of retrieving and associating and assessing and analyzing the plurality of database records comprising transaction data and further comprising qualifying evidence, and further comprising
   rendering interoperable each of the plurality of units of the directed digital currency in the computer network and further comprising
   self-authenticating an element associated with the first unique tag, and further comprising
   one or more of issuing and exchanging and trading of a unit of the directed digital currency comprising an exchange for exchange item;
   the exchange item comprising one or more of an item and an inducement and an incentive and a consideration and a recognition and a benefit and a value for any purpose; and couple the generated first unique tag with a first object, comprising a first tag-object and further comprising a voucher-tag-object and further comprising a unit of the directed digital currency; and store, in the non-transitory machine readable medium, in the first database the first unique tag comprising a representation of the unit of a plurality of units of the directed digital currency and further comprising the first tag-object
   the storing of the first unique tag comprising a format comprising one of a) a contiguous string and b) one or more segments in the first database;

wherein the unit of a plurality of units of the directed digital currency is enabled for executing at least one computer operation via the first unique tag.

2. The apparatus of claim 1 further comprising one or more of 1) the currency outputting module configured for generating units of the directed digital currency, 2) a detecting module for detecting at least one of a tag and a tag-object and qualifying evidence and a user comprising a user behavior, 3) a currency redemption module configured for exchanging units of the directed digital currency, 4) a configuration module for configuring the apparatus for interoperability, 5) an interoperability tag generating module comprising one of a random tag generator and a barrel shifter unit, 6) a voucher identity tag generating module for applying a unique voucher identity tag to each unit of the directed digital currency, 7) a qualifying evidence tag generating module for generating a qualifying evidence tag, 8) a transaction associating module for retrieving and associating and assessing and analyzing database records via at least one of a tag and a tag-object, and 9) an enrollment module for enrolling a participant in the computer network.

3. A computer-implemented method in a computer system comprising a computer network and further comprising a computer system for performing a computer methodology comprising enabling a computer operation comprising at least one of retrieving and associating and assessing and analyzing database records corresponding to at least one unit of a plurality of units of a directed digital currency, the method further comprising:
   configuring, by the computer system, the computer system and the computer network comprising a network processor and further comprising at least one of a first database comprising a plurality of database records, and further comprising at least one of a plurality of disparate groups comprising at least one of a plurality of unaffiliated and affiliated purpose systems and further comprising participants and further comprising at least one of a participant comprising at least one of a member and a directed digital currency redeemer having at least one of a physical location and a website, for interoperability of units of a directed digital currency among the at least one of the plurality of unaffiliated and affiliated purpose systems in the computer network; and
   generating, by the computer system in a non-transitory machine readable medium, in accordance with at least one interoperability rule associated with a rule module and further associated with the computer network, a first unique tag comprising a string, the first unique tag associated with a unit of a plurality of units of the directed digital currency, the string further comprising a coupling of elements, the elements comprising:

1) an interoperability tag for a plurality of units of the directed digital currency, and further comprising at least one of:
2) a unique identifier comprising a voucher identity tag for each unit of the plurality of units of the directed digital currency, and
3) additional data comprising:
   a) data comprising one of transaction data tied to at least one of (i) a transaction, comprising a behavior or an act, and (ii) a session and (iii) qualifying evidence, the qualifying evidence associated with one or more of a first user comprising a user identifier and of a purpose system and a participant; and further comprising
   b) a code, comprising one of an identifier and a tag and a computer system-generated code; and
4) a rule, comprising a direction toward a purpose; and
5) an instruction, comprising a direction toward a purpose; and
6) example element for executing at least one computer operation comprising a process, the example element comprising a matching of database elements, each unit of the directed digital currency comprising at least one of a plurality of forms or embodiments of an association of the generated first unique tag and a corresponding object comprising a physical or a digital tag-object, and each tag-object comprising a) a composite entity comprising an article of manufacture, and further comprising b) an embodiment of value comprising a unit of exchange interoperable in the computer network, and further comprising c) a corresponding entry in at least one database record;
   the embodiment of value comprising any kind of value for any purpose that can be one or more of conveyed and directed and stored and exchanged for an exchange item, the first unique tag further comprising a computer methodology for enabling at least one computer operation for any purpose via the first unique tag, the computer methodology comprising:
   at least one feature, associated with each unit of the plurality of units of the directed digital currency, comprising an enabling of, and further comprising a capability for, an executing of at least one computer operation via the first unique tag, and further comprising
   a matching of elements in the plurality of database records, the elements comprising the data and further comprising the example element, irrespective of the at least one of a plurality of forms or embodiments of a unit of the directed digital currency, and further comprising
   a reference tag, and further comprising
   a module, comprising the network processor, for executing an at least one computer operation via an at least one unique tag,
the at least one computer operation comprising:
   one or more of retrieving and associating and assessing and analyzing the plurality of database records comprising transaction data and further comprising qualifying evidence, and further comprising rendering interoperable each of the plurality of units of the directed digital currency in the computer network and further comprising
   self-authenticating an element associated with the first unique tag, and further comprising
   one or more of issuing and exchanging and trading of a unit of the directed digital currency comprising an exchange for exchange item;
   the exchange item comprising one or more of an item and an inducement and an incentive and a consideration and a recognition and a benefit and a value for any purpose; and
coupling, by the computer system, the first unique tag with a first object, comprising a first tag-object and further comprising a voucher-tag-object and further comprising a unit of the directed digital currency; and
storing, by the computer system in the non-transitory machine readable medium, in the first database the first unique tag comprising a representation of the unit of a plurality of units of the directed digital currency and further comprising the first tag-object
   the storing of the first unique tag comprising a format comprising one of a) a contiguous string and b) one or more segments in the first database;
wherein the unit of a plurality of units of the directed digital currency is enabled for executing at least one computer operation via the first unique tag.

4. The method of claim 3 wherein the at least one feature further comprises an enabling of, and further comprises a capability for, by the computer system, at least one of generating, recording, detecting, validating, updating, authorizing, retrieving, identifying, encoding, aggregating, associating, processing, issuing, distributing, transmitting, communicating, copying, converting, restricting, redeeming, invalidating, securing, exchanging, screening, combining, assessing, analyzing, tracking, funding, accounting for, displaying, using comprising qualifying for, and rendering the interoperability of, at least one tag-object comprising at least one unit of the directed digital currency.

5. The method of claim 3 wherein the at least one of a plurality of forms or embodiments of the coupling of the first object and the first unique tag, comprising the first tag-object, further comprises at least one of:
   1) a first form comprising an electronic representation in a machine, and
   2) a second form comprising at least one of a physical and a digital tag-object in any form, and
   3) a third form comprising an embodiment in a machine-readable non-transitory medium, and
   4) a fourth form comprising a representation recorded in the first database, the first unique tag comprising a standardized form; and
   wherein each form or embodiment of a first unit of directed digital currency is functionally equivalent to each other form or embodiment, each form or embodiment representing the first unit of the directed digital currency, each form or embodiment comprising the computer methodology and further comprising enabling a computer operation comprising a) conveying and b) exchanging the directed digital currency.

6. The method of claim 3 wherein the form or embodiment of the tag-object comprising a unit of the directed digital currency further comprises a form or embodiment comprising at least one of a machine, an apparatus, a database, an electronic device, a user interface, a memory, a string, a code, a data container, a website element or icon, a device tied to the Internet comprising a device associated with an Internet of Things, a vehicle, a token, a card, a payment device, a payment object, an account, a wearable device, an implantable device, an accessory, a printed sheet, a voucher, an exchange item, a reward currency, a digital currency, a credit, a discount, a coupon, a monetary vouchertag-object, a non-monetary voucher-tag-object, a dual use object, an adaptive voucher-tag-object, an article of manufacture comprising a non-transitory machine-readable medium, a marketing tool, an electronic form, a physical form, and a combination thereof.

7. The method of claim 3 further comprising:
generating, by the computer system, a second unique tag corresponding to a second unit of the directed digital currency comprising a second tag-object, comprising a second transaction; and
wherein the method further comprises the computer methodology via at least a common portion of at least one of the first and the second generated unique tags or tag-objects.

8. The method of claim 3 further comprising at least one of conveying, by the computer system, at least one unit of the directed digital currency, and further comprising conveying by one of distributing, issuing, communicating, detecting, transmitting, transferring, storing, aggregating, converting, exchanging, and redeeming, and further comprising conveying to one of the first user, a user device, a participant device, a computer network device, a website, an account, a non-transitory medium, a machine, an object, and a database.

9. The method of claim 3 further comprising detecting, by the computer system, the first unique tag for any purpose.

10. The method of claim 3 further comprising applying, by the computer system, a restriction to at least one unit of the directed digital currency, the restriction comprising one or more of a term and a condition and a control and further comprising one of a) an expiration date, and b) a redemption requirement, and c) one of a requirement and no requirement comprising one of a proprietary third party restriction and a prior enrollment and a use of a type of device and a personal identification of the first user, and d) a restriction associated with one of a purpose system and a participant and a purpose program and a user, and e) any controllable criterion encoded in a tag.

11. The method of claim 3 further comprising:
associating, by the computer system, an icon with a user interface comprising at least one of a module and an apparatus and a web site and a display screen for enabling at least one of the transaction comprising a exchange-eligible transaction; and
marking, by the computer system, at least one exchange-eligible item of a plurality of exchange-eligible items, comprising applying a first exchange-eligibility tag to the at least one exchange-eligible item; and
associating, by the computer system, the icon with the at least one exchange-eligible item; and
associating, by the computer system, the icon with the first user identifier corresponding to the first user; and
activating, by the computer system, the icon, comprising transacting the exchange-eligible item; and
associating, by the computer system, the exchange-eligible transaction with at least one of a plurality of exchange-eligible transactions; and
wherein activating the icon comprises at least one of an initiation and a consummation, by the computer system, of the at least one exchange-eligible transaction for the at least one exchange-eligible item, via activating the icon, comprising generating a unique tag and further comprising generating at least one corresponding tag-object comprising at least one unit of the directed digital currency, and further comprising enabling the computer methodology.

12. The method of claim 3 wherein the tag further comprises a computer methodology for qualifying, by the computer system, the first user, associated with at least one transaction of a plurality of transactions, for receiving at least one unit of the directed digital currency, wherein the tag comprises a method for associating the first user and the at least one transaction.

13. The method of claim 3 further comprising aggregating, by the computer system, units of the directed digital currency.

14. The method of claim 3 further comprising converting, by the computer system, a proprietary currency associated with a purpose system or a marketing system, and further comprising replacing or exchanging the proprietary currency, with one or more units of the directed digital currency, via the first unique tag.

15. The method of claim 3 wherein the first database further comprises a plurality of database records corresponding to a fee comprising a voucher fee and a exchange fee and further corresponding to at least one unit of the directed digital currency, the method further comprising at least one of establishing the fee amount and allocating the fee and collecting the fee and paying the fee, by the computer system, via at least a portion of the first unique tag.

16. The method of claim 3 further comprising applying, by the computer system, a security measure comprising one of an anti-fraud measure and a privacy measure and an identity protection measure, to at least one of the first unique tag and the first tag-object.

17. The method of claim 3 further comprising applying, by the computer system, a cost-control measure comprising one or more of 1) a fee limit, and 2) exchange-eligibility of an item, and 3) an adjustable requirement for controlling, in a time period, at least one of (a) a quantity of the units of the directed digital currency distributed, and (b) a value of the units of the directed digital currency generated, and (c) one of a number and a percentage of users to receive the directed digital currency, and (d) a qualification requirement, and e) timing associated with a cost-control measure.

18. The method of claim 3 further comprising generating, by the computer system, a message, in response to detecting the first tag-object comprising the first unique tag, the message comprising one or more of an indication of an authorization, a qualification requirement, a list of exchange items for exchanging, a list of at least one participant, an incentive, an offer, an advertisement, and information associated with a directed digital currency unit.

19. The method of claim 3 further comprising generating, by the computer system, an adaptive voucher-tag-object comprising an embodiment of the directed digital currency and further comprising a coupon that is one of adaptive to, responsive to, associated with, contingent upon, and targeted via all or a portion of the first unique tag.

20. A system associated with units of a directed digital currency, the system comprising:
a currency system comprising a computer network comprising a computer system and further comprising at least one of a plurality of disparate groups comprising at least one of a plurality of unaffiliated and affiliated purpose systems and further comprising participants and further comprising at least one of a participant comprising at least one of a member and a directed digital currency redeemer having at least one of a physical location and a web site; and
a network processor coupled to the computer network; and a machine readable non-transitory medium, coupled to the network processor, the machine readable non-transitory medium comprising:
a first database comprising a plurality of database records, each database record corresponding to at least one unit of a plurality of units of a directed digital currency; and
at least one instruction, that when executed by the network processor causes the network processor to be further configured to:
configure the computer system and the computer network for interoperability of the units of the directed digital currency among the at least one of the plurality of unaffiliated and affiliated purpose systems in the computer network; and
generate in the non-transitory machine readable medium, in accordance with at least one interoperability rule associated with a rule module associated with the computer system, a first unique tag comprising a string, the first unique tag associated with a unit of the plurality of units of the directed digital currency, the string further comprising a coupling of elements, the elements comprising:
  1) an interoperability tag for a plurality of units of the directed digital currency, and further comprising at least one of:
  2) a unique identifier comprising a voucher identity tag for each unit of the plurality of units of the directed digital currency, and
  3) additional data comprising:
    a) data comprising one of transaction data tied to at least one of (i) a transaction, comprising a behavior or an act, and (ii) a session and (iii) qualifying evidence, the qualifying evidence associated with one or more of a first user comprising a user identifier and a purpose system and a participant; and further comprising
    b) a code, comprising one of an identifier and a tag and a network processor-generated code, and
  4) a rule, comprising a direction toward a purpose; and
  5) an instruction, comprising a direction toward a purpose; and
  6) example element for executing computer operation comprising a process, the at least one example element comprising a matching of database elements,
  each unit of the directed digital currency comprising at least one of a plurality of forms or embodiments of an association of the generated first unique tag and a corresponding object comprising a physical or a digital tag-object, and
  each tag-object comprising a) a composite entity comprising an article of manufacture, and further comprising b) an embodiment of value comprising a unit of exchange interoperable in the computer network, and further comprising c) a corresponding entry in at least one database record;
    the embodiment of value comprising any kind of value for any purpose that can be one or more of conveyed and directed and stored and exchanged for an exchange item,
  the first unique tag further comprising a computer methodology for enabling at least one computer operation for any purpose via the first unique tag, the computer methodology comprising:
    at least one feature, associated with each unit of the plurality of units of the directed digital currency, comprising an enabling of, and further comprising a capability for, an executing of at least one computer operation via the first unique tag, and further comprising
    a matching of elements in the plurality of database records, the elements comprising the data and further comprising the example element, irrespective of the at least one of a plurality of forms or embodiments of a unit of the directed digital currency, and further comprising
    a reference tag, and further comprising
    a module, comprising the network processor, for executing an at least one computer operation via an at least one unique tag,
  the at least one computer operation comprising:
    one or more of retrieving and associating and assessing and analyzing the plurality of database records comprising transaction data and further comprising qualifying evidence, and further comprising
    rendering interoperable each of the plurality of units of the directed digital currency in the computer network and further comprising
    self-authenticating an element associated with the first unique tag, and further comprising
    one or more of issuing and exchanging and trading of a unit of the directed digital currency comprising an exchange for exchange item;
    the exchange item comprising one or more of an item and an inducement and an incentive and a consideration and a recognition and a benefit and a value for any purpose; and
couple the generated first unique tag with a first object, comprising a first tag-object and further comprising a voucher-tag-object and further comprising a unit of the directed digital currency; and
store, in the non-transitory machine readable medium, in the first database the first unique tag comprising a representation of the unit of a plurality of units of the directed digital currency and further comprising the first tag-object
  the storing of the first unique tag comprising a format comprising one of a) a contiguous string and b) one or more segments in the first database;
wherein the unit of a plurality of units of the directed digital currency is enabled for executing at least one computer operation via the first unique tag.

21. The system of claim 20 wherein the at least one feature further comprises an enabling of, and further comprises a capability for, at least one of generating, recording, detecting, validating, updating, authorizing, retrieving, identifying, encoding, aggregating, associating, processing, issuing, distributing, transmitting, communicating, copying, converting, restricting, redeeming, invalidating, securing, exchanging, screening, combining, assessing, analyzing, tracking, funding, accounting for, displaying, using comprising qualifying for, and rendering the interoperability of, at least one tag-object comprising at least one unit of the directed digital currency.

22. The system of claim 20 wherein the at least one of a plurality of forms or embodiments of the coupling of the first object and the first unique tag, comprising the first tag-object, further comprises at least one of:
  1) a first form comprising an electronic representation in a machine, and
  2) a second form comprising at least one of a physical and a digital tag-object in any form, and
  3) a third form comprising an embodiment in a machine-readable non-transitory medium, and 4) a fourth form comprising a representation recorded in the first database, the first unique tag comprising a standardized form; and wherein each form or embodiment of a first unit of directed digital currency is functionally equivalent to each other form or embodiment, each form or embodiment representing the first unit of the directed digital currency, each form or embodiment comprising the computer methodology and further comprising enabling a computer operation comprising a) conveying and b) exchanging the directed digital currency.

23. The system of claim 20 wherein the form or embodiment of the tag-object comprising a unit of the directed digital currency further comprises a form or embodiment comprising at least one of a machine, an apparatus, a database, an electronic device, a user interface, a memory, a string, a code, a data container, a website element or icon, a device tied to the Internet comprising a device associated with an Internet of Things, a vehicle, a token, a card, a payment device, a payment object, an account, a wearable device, an implantable device, an accessory, a printed sheet, a voucher, an exchange item, a reward currency, a digital currency, a credit, a discount, a coupon, a monetary voucher-tag-object, a non-monetary voucher-tag-object, a dual use object, an adaptive voucher-tag-object, an article of manufacture comprising a non-transitory machine-readable medium, a marketing tool, an electronic form, a physical form, and a combination thereof.

24. The system of claim 20 wherein the at least one instruction further causes the network processor to be configured for:

generating a second unique tag corresponding to a second unit of the directed digital currency comprising a second tag-object, comprising a second transaction; and wherein the system further comprises the computer methodology via at least a common portion of at least one of the first and the second generated unique tags or tag-objects.

25. The system of claim 20 wherein the at least one instruction further causes the network processor to be configured for conveying at least one unit of the directed digital currency, and further comprising conveying by one of distributing, issuing, communicating, detecting, transmitting, transferring, storing, aggregating, converting, exchanging, and redeeming, and further comprising conveying to one of the first user, a user device, a participant device, a computer network device, a website, an account, a non-transitory medium, a machine, an object, and a database.

26. The system of claim 20 wherein the at least one instruction further causes the network processor to be configured for detecting the first unique tag for any purpose.

27. The system of claim 20 wherein the at least one instruction further causes the network processor to be configured for applying a restriction to at least one unit of the directed digital currency, the restriction comprising one or more of a term and a condition and a control and further comprising one of a) an expiration date, and b) a redemption requirement, and c) one of a requirement and no requirement comprising one of a proprietary third party restriction and a prior enrollment and a use of a type of device and a personal identification of the first user, and d) a restriction associated with one of a purpose system and a participant and a purpose program and a user, and e) any controllable criterion encoded in a tag.

28. The system of claim 20 wherein the at least one instruction further causes the network processor to be configured for:

associating an icon with a user interface comprising at least one of a module and an apparatus and a website and a display screen for enabling at least one of the transaction comprising a exchange-eligible transaction; and marking at least one exchange-eligible item of a plurality of exchange-eligible items, comprising applying a first exchange-eligibility tag to the at least one exchange-eligible item; and associating the icon with the at least one exchange-eligible item; and associating the icon with the first user identifier corresponding to the first user; and activating the icon, comprising transacting the item; and associating the exchange-eligible transaction with at least one of a plurality of exchange-eligible transactions; and wherein activating the icon comprises at least one of an initiation and a consummation of the at least one exchange-eligible transaction for the at least one exchange-eligible item, via activating the icon, comprising generating a unique tag and further comprising generating at least one corresponding tag-object comprising at least one unit of the directed digital currency, and further comprising enabling the computer methodology.

29. The system of claim 20 wherein the tag comprises the computer methodology for qualifying the first user, associated with at least one transaction of a plurality of transactions, for receiving at least one unit of the directed digital currency, wherein the tag comprises a method for associating the first user and the at least one transaction.

30. The system of claim 20 wherein at least one instruction further causes the network processor to be configured for aggregating, by the first user, units of the directed digital currency.

31. The system of claim 20 wherein at least one instruction further causes the network processor to be configured for converting a proprietary currency associated with a purpose system or a marketing system, and further comprising replacing or exchanging the proprietary currency with one or more units of the directed digital currency, via the first unique tag.

32. The system of claim 20 wherein the first database further comprises a plurality of database records corresponding to a fee comprising a voucher fee and a exchange fee and further corresponding to at least one unit of the directed digital currency, wherein the at least one instruction when executed by the network processor causes the network processor to be configured for at least one of establishing the fee amount and allocating and collecting and paying the fee, via at least a portion of the first unique tag.

33. The system of claim 20 wherein the at least one instruction further causes the network processor to be configured for applying a security measure, comprising one of an anti-fraud measure and a privacy measure and an identity protection measure, to at least one of the first unique tag and the first tag-object.

34. The system of claim 20 wherein the at least one instruction further causes the network processor to be configured for applying a cost-control measure comprising one or more of 1) a fee limit, and 2) exchange-eligibility of an item, and 3) an adjustable requirement for controlling, in a time period, at least one of (a) a quantity of the units of the directed digital currency distributed, and (b) a value of the units of the directed digital currency generated, and (c) one of a number and a percentage of users to receive the directed digital currency, and (d) a qualification requirement, and e) timing associated with a cost-control measure.

35. The system of claim 20 wherein the at least one instruction further causes the network processor to be configured for generating a message, in response to detecting the first tag-object comprising the first unique tag, the message comprising one or more of an indication of an authorization, a qualification requirement, a list of exchange items for exchanging, a list of at least one participant, an incentive, an offer, an advertisement, and information associated with a directed digital currency unit.

36. The system of claim 20 wherein the at least one instruction further causes the network processor to be configured for generating an adaptive tag-object comprising an embodiment of the directed digital currency and further comprising a coupon that is one of adaptive to, responsive to, associated with, contingent upon, and targeted via all or a portion of the first unique tag.

37. A non-transitory machine readable medium containing program instructions for performing a computer methodology comprising enabling a computer operation comprising at least one of retrieving and associating and assessing and analyzing database records, each database record corresponding to a unit of a plurality of units of a directed digital currency, wherein execution of the program instructions by one or more network processors of a currency system comprising a computer network and further comprising a computer system causes the one or more network processors to carry out the steps of:

configuring the non-transitory machine readable medium and the computer network, comprising at least one of a first database comprising a plurality of database records, the currency system comprising at least one of a plurality of disparate groups comprising at least one of a plurality of unaffiliated and affiliated purpose systems and further comprising participants and further comprising at least one of a participant comprising at least one of a member and a directed digital currency redeemer having at least one of a physical location and a web site, for interoperability of units of a directed digital currency among the at least one of the plurality of unaffiliated and affiliated purpose systems in the computer network; and generating in the non-transitory machine readable medium, in accordance with at least one interoperability rule associated with a rule module associated with the computer network, a first unique tag comprising a string, the first unique tag associated with a unit of a plurality of units of the directed digital currency, the string further comprising a coupling of elements, the elements comprising:
1) an interoperability tag for a plurality of units of the directed digital currency, and further comprising at least one of:
2) a unique identifier comprising a voucher identity tag for each unit of the plurality of units of the directed digital currency, and
3) additional data comprising:
 a) data comprising one of transaction data tied to at least one of (i) a transaction, comprising a behavior or an act, and (ii) a session and (iii) qualifying evidence, the qualifying evidence associated with one or more of a first user comprising a user identifier and a purpose system and a participant; and further comprising
 b) a code, comprising one of an identifier and a tag and a network processor-generated code, and
4) a rule, comprising a direction toward a purpose; and
5) an instruction, comprising a direction toward a purpose; and
6) example element for executing computer operation comprising a process, the at least one example element comprising a matching of database elements, each unit of the directed digital currency comprising at least one of a plurality of forms or embodiments of an association of the generated first unique tag and a corresponding object comprising a physical or a digital tag-object, and each tag-object comprising a) a composite entity comprising an article of manufacture, and further comprising b) an embodiment of value comprising a unit of exchange interoperable in the computer network, and further comprising c) a corresponding entry in at least one database record;
 the embodiment of value comprising any kind of value for any purpose that can be one or more of conveyed and directed and stored and exchanged for an exchange item,
the first unique tag further comprising a computer methodology for enabling at least one computer operation for any purpose via the first unique tag,
the computer methodology comprising:
 at least one feature, associated with each unit of the plurality of units of the directed digital currency, comprising an enabling of, and further comprising a capability for, an executing of at least one computer operation via the first unique tag, and further comprising
 a matching of elements in the plurality of database records, the elements comprising the data and further comprising the example element, irrespective of the at least one of a plurality of forms or embodiments of a unit of the directed digital currency, and further comprising
 a reference tag, and further comprising
 a module, comprising the network processor, for executing an at least one computer operation via an at least one unique tag,
the at least one computer operation comprising:
 one or more of retrieving and associating and assessing and analyzing the plurality of database records comprising transaction data and further comprising qualifying evidence, and further comprising
 rendering interoperable each of the plurality of units of the directed digital currency in the computer network and further comprising
 self-authenticating an element associated with the first unique tag, and further comprising
 one or more of issuing and exchanging and trading of a unit of the directed digital currency comprising an exchange for exchange item;
 the exchange item comprising one or more of an item and an inducement and an incentive and a consideration and a recognition and a benefit and a value for any purpose; and
coupling the first unique tag with a first object, comprising a first tag-object and further comprising a voucher-tag-object and further comprising a unit of the directed digital currency; and
storing, in the non-transitory machine readable medium, in the first database the first unique tag comprising a representation of the unit of a plurality of units of the directed digital currency and further comprising the first tag-object the storing of the first unique tag comprising a format comprising one of a) a contiguous string and b) one or more segments in the first database;

wherein the unit of a plurality of units of the directed digital currency is enabled for executing at least one computer operation via the first unique tag.

38. The non-transitory machine readable medium of claim 37 wherein the at least one of a plurality of forms or embodiments of the coupling of the first object and the first unique tag, comprising the first tag-object, further comprises at least one of:

1) a first form comprising an electronic representation in a machine, and
2) a second form comprising at least one of a physical and a digital tag-object in any form, and
3) a third form comprising an embodiment in a machine readable non-transitory medium, and
4) a fourth form comprising a representation recorded in the first database, the first unique tag comprising a standardized form; and wherein each form or embodiment of a first unit of directed digital currency is functionally equivalent to each other form or embodiment, each form or embodiment representing the first unit of the directed digital currency, each form or embodiment comprising the computer methodology and further comprising enabling a computer operation comprising a) conveying and b) exchanging the directed digital currency.

39. The method of claim 3 wherein the at least one of a plurality of unaffiliated and affiliated purpose systems further comprises:

a group or a network comprising one or more of a member and a business and an enterprise and a collaboration and a promotion and an organization and an entity that displays or generates or issues or uses the directed digital currency, and further comprises one or more of a business and an organization and a professional and a merchant and a service and a provider and a corporation and an employer and a manufacturer and a nonprofit and a government and a person and a web site and a payments firm and a financial services firm and an airline and a chain of stores and a trade association and a consortium and a media firm and a marketing organization and an advertising organization and a representative and an agent and a distributor and a processor and an aggregator, and any combination or collective effort thereof for any purpose, and further comprises one of a business-consumer system, a peer-to-peer system, an employer-employee system, a charity-donor system, a teacher-student system, a doctor-patient system, and a government-citizen system.

40. The method of claim 3 wherein the exchange item further comprises:

one or more of a conveyed value directed toward modifying human behavior for any purpose, and further comprises one or more of a product and a service and a meal and food and an experience and entertainment and information and an entry to an event and an entry in a sweepstakes and a ticket and a coupon and an honor, and further comprises a payment and a compensation and a credit and a discount and cash and a bonus and a remuneration, and further comprises a service comprising an analysis and advice and news, and further comprises data comprising a digital download comprising one of a movie and music and an image, and further comprises one or more of an item having one of monetary value and non-monetary value and useful value for any purpose.

* * * * *

UNITED STATES PATENT AND TRADEMARK OFFICE
CERTIFICATE OF CORRECTION

PATENT NO. : 10,614,478 B1
APPLICATION NO. : 16/185972
DATED : April 7, 2020
INVENTOR(S) : Randolph Georgi It is certified that error appears in the above-identified patent and that said Letters Patent is hereby corrected as shown below:

In the Claims

Claim 1, Line 65 (Column 19 Line 14):
Change "6) example element" to --6) an example element--

Claim 1, Line 79 (Column 19 Line 28):
Change "least one database record;" to --least one database record,--

Claim 1, Line 111 (Column 19 Line 60):
Change "network and further comprising" to --network, and further comprising--

Claim 1, Line 116 (Column 19 Line 65):
Change "an exchange for exchange item;" to --an exchange for an exchange item,--

Claim 1, Line 129 (Column 20 Line 11):
Change "first tag object" to --first tag object,--

Claim 3, Line 44 (Column 21 Line 13):
Change "identifier and of a purpose system" to --identifier and a purpose system--

Claim 3, Line 51 (Column 21 Line 20):
Change "6) example element" to --6) an example element--

Claim 3, Line 64 (Column 21 Line 33):
Change "least one database record;" to --least one database record,--

Claim 3, Line 96 (Column 21 Line 65):
Change "network and further comprising" to --network, and further comprising--

Signed and Sealed this
Sixteenth Day of June, 2020

Andrei Iancu
*Director of the United States Patent and Trademark Office*

CERTIFICATE OF CORRECTION (continued)
U.S. Pat. No. 10,614,478 B1

Claim 3, Line 101 (Column 22 Line 3):
Change "an exchange for exchange item;" to --an exchange for an exchange item,--

Claim 3, Line 114 (Column 22 Line 16):
Change "further comprising the first tag object" to --further comprising the first tag object,--

Claim 20, Line 55 (Column 25 Line 43):
Change "6) example element" to --6) an example element--

Claim 20, Line 55 (Column 25 Line 43):
Change "6) example element for executing computer operation" to --6) example element for executing at least one computer operation--

Claim 20, Line 56 (Column 25 Line 44):
Change "comprising a process, the at least one example ele[ment]" to --comprising a process, the example ele[ment]- --

Claim 20, Line 68 (Column 25 Line 56):
Change "least one database record;" to --least one database record,--

Claim 20, Line 100 (Column 26 Line 21):
Change "network and further comprising" to --network, and further comprising--

Claim 20, Line 105 (Column 26 Line 26):
Change "an exchange for exchange item;" to --an exchange for an exchange item,--

Claim 20, Line 118 (Column 26 Line 39):
Change "first tag object" to --first tag object,--

Claim 37, Line 53 (Column 30 Line 6):
Change "6) example element" to --6) an example element--

Claim 37, Line 53 (Column 30 Line 6):
Change "6) example element for executing computer operation" to --6) example element for executing at least one computer operation--

Claim 37, Line 54 (Column 30 Line 7):
Change "comprising a process, the at least one example ele[ment]" to --comprising a process, the example ele[ment]- --

Claim 37, Line 66 (Column 30 Line 20):
Change "least one database record;" to --least one database record,--

Claim 37, Line 103 (Column 30 Line 57):
Change "an exchange for exchange item;" to --an exchange for an exchange item,--

CERTIFICATE OF CORRECTION (continued)
U.S. Pat. No. 10,614,478 B1

Claim 37, Line 116 (Column 31 Line 3):
Change "first tag object" to --first tag object,--

Claim 39, Line 13 (Column 32 Line 7):
Change "and a web site and a" to --and a website and a--